United States Patent
Lee et al.

(10) Patent No.: US 10,455,600 B2
(45) Date of Patent: Oct. 22, 2019

(54) METHOD FOR TRANSMITTING AND RECEIVING DATA IN WIRELESS COMMUNICATION SYSTEM AND APPARATUS FOR THE SAME

(71) Applicant: LG ELECTRONICS INC., Seoul (KR)

(72) Inventors: Eunjong Lee, Seoul (KR); Heejeong Cho, Seoul (KR); Genebeck Hahn, Seoul (KR); Ilmu Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 88 days.

(21) Appl. No.: 15/563,781

(22) PCT Filed: Dec. 2, 2015

(86) PCT No.: PCT/KR2015/013053
§ 371 (c)(1),
(2) Date: Oct. 2, 2017

(87) PCT Pub. No.: WO2016/163623
PCT Pub. Date: Oct. 13, 2016

(65) Prior Publication Data
US 2018/0098337 A1    Apr. 5, 2018

Related U.S. Application Data

(60) Provisional application No. 62/144,339, filed on Apr. 8, 2015.

(51) Int. Cl.
*H04W 72/12* (2009.01)
*H04W 72/04* (2009.01)
(Continued)

(52) U.S. Cl.
CPC ....... *H04W 72/1205* (2013.01); *H04L 5/0053* (2013.01); *H04L 27/2602* (2013.01);
(Continued)

(58) Field of Classification Search
None
See application file for complete search history.

(56) References Cited

U.S. PATENT DOCUMENTS

2011/0176634 A1* 7/2011 Yoon ............ H04L 5/0023
375/295
2011/0255451 A1* 10/2011 Moon ............ H04L 5/0007
370/280

(Continued)

FOREIGN PATENT DOCUMENTS

WO    WO 2014/124164 A1    8/2014

OTHER PUBLICATIONS

Ericsson, "Study on Latency Reduction Techniques for LTE", RP-150310, 3GPP TSG RAN, Meeting #67, Shanghai, China, Sep. 2014, 18 pgs.

(Continued)

*Primary Examiner* — Kevin C. Harper
*Assistant Examiner* — Derrick V Rose
(74) *Attorney, Agent, or Firm* — Birch, Stewart, Kolasch & Birch, LLP

(57) ABSTRACT

In a method for transmitting data in a wireless communication system supporting a low latency service according to the present invention, a method performed by a first UE comprises transmitting to an eNB an urgent signal (US) for informing of occurrence of an event related to an urgent situation; receiving from the eNB a response to the urgent signal through two PHICH (Physical HARQ Indication Channel) resources; and transmitting to the eNB urgent data including detailed information related to the occurred event (Continued)

on the basis of the received response, wherein each PHICH resource is determined by a Physical Resource Block (PRB) index of the resource to which the urgent signal is transmitted.

20 Claims, 34 Drawing Sheets

(51) Int. Cl.
 H04L 27/26 (2006.01)
 H04L 5/00 (2006.01)
(52) U.S. Cl.
 CPC ..... *H04W 72/042* (2013.01); *H04W 72/1273* (2013.01); *H04W 72/1278* (2013.01); *H04L 5/0051* (2013.01); *H04L 5/0055* (2013.01); *H04W 72/0406* (2013.01); *H04W 72/0446* (2013.01)

(56) References Cited

U.S. PATENT DOCUMENTS

| | | | |
|---|---|---|---|
| 2014/0071954 A1* | 3/2014 | Au | H04W 72/0446 370/336 |
| 2014/0226607 A1 | 8/2014 | Holma et al. | |
| 2014/0328260 A1* | 11/2014 | Papasakellariou | H04W 72/1289 370/329 |
| 2016/0285775 A1* | 9/2016 | Damnjanovic | H04L 47/30 |

OTHER PUBLICATIONS

Huawei et al., "Motivation of New SI Proposal Latency Reduction", RP-150238, 3GPP TSG RAN, Meeting #67, Shanghai, China, Mar. 9-12, 2015, 14 pgs.

* cited by examiner

[Figure 1]
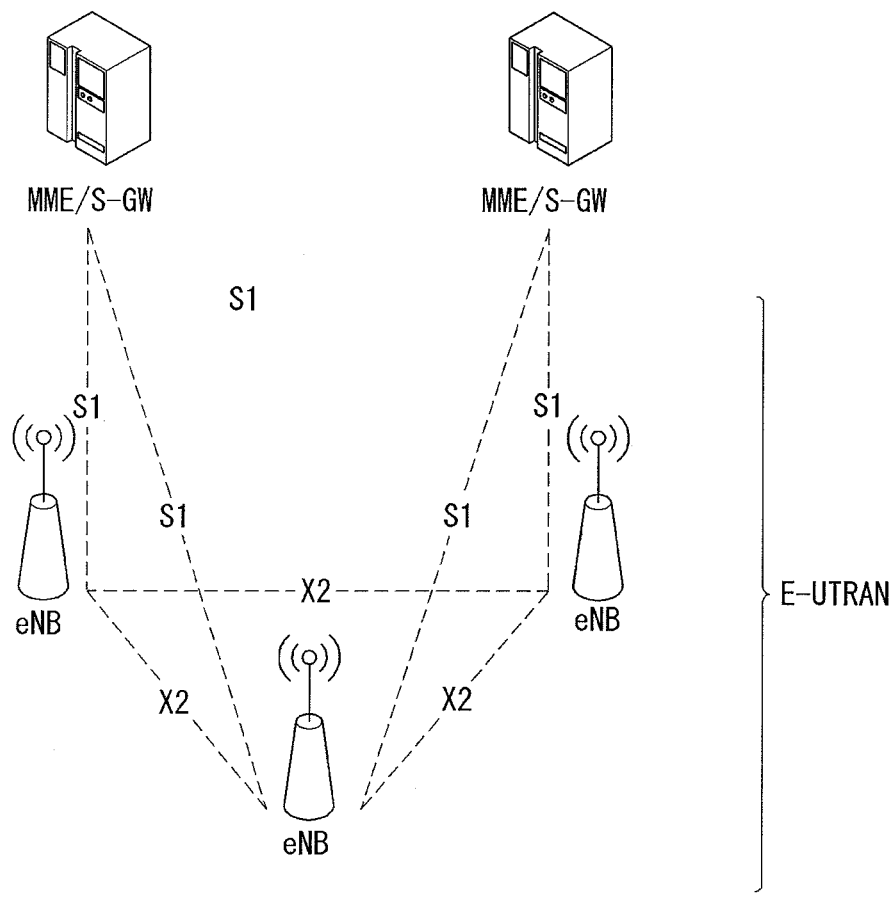

[Figure 2]
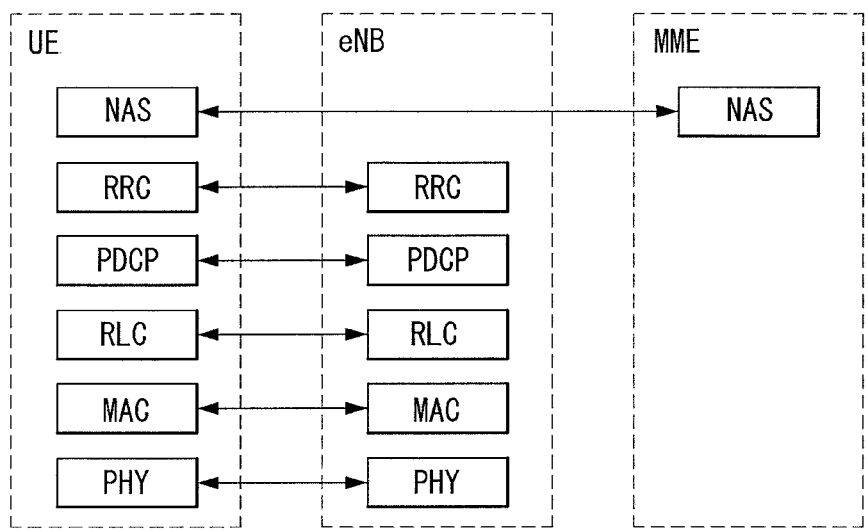
(a) Control plane protocol stack
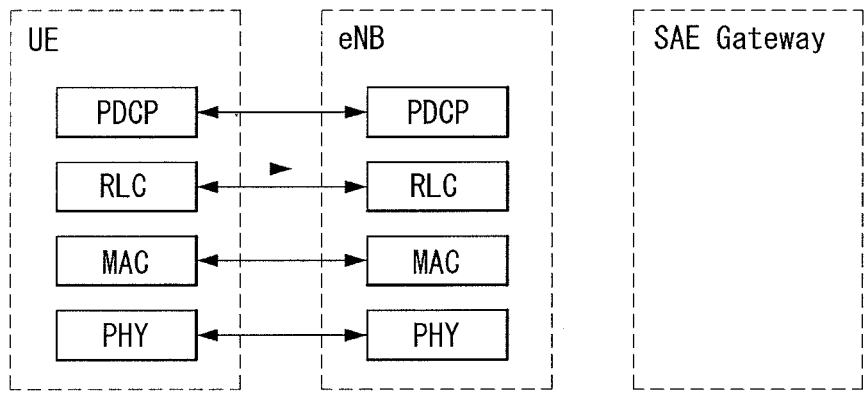
(b) User plane protocol stack

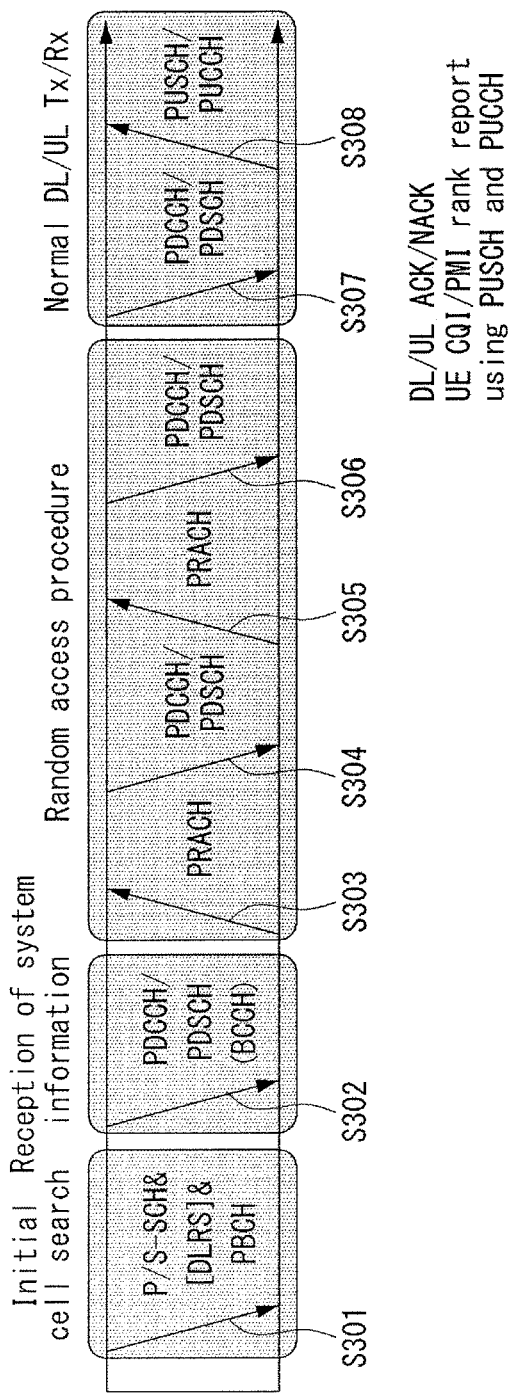

[Figure 4]
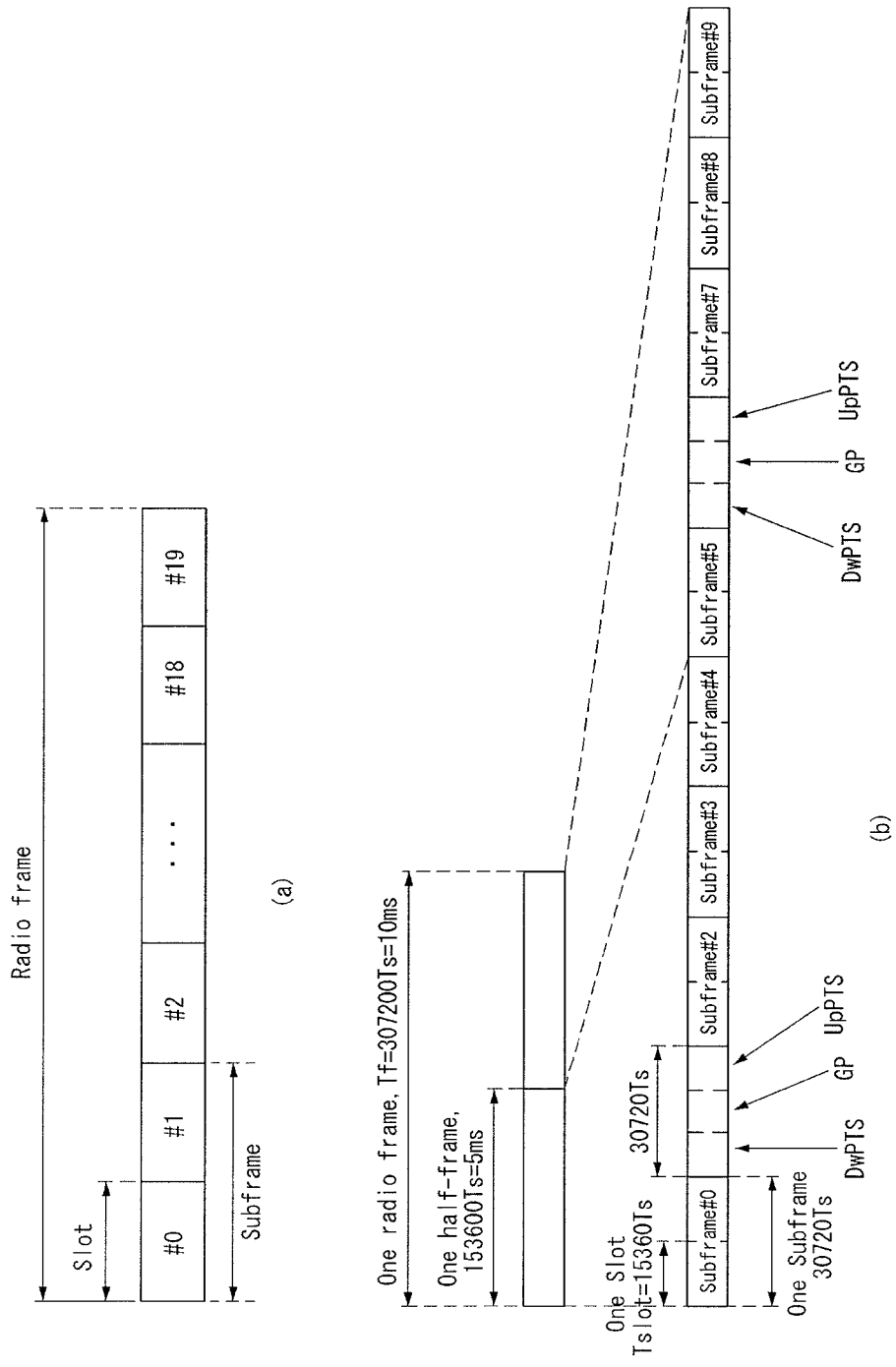

[Figure 5]
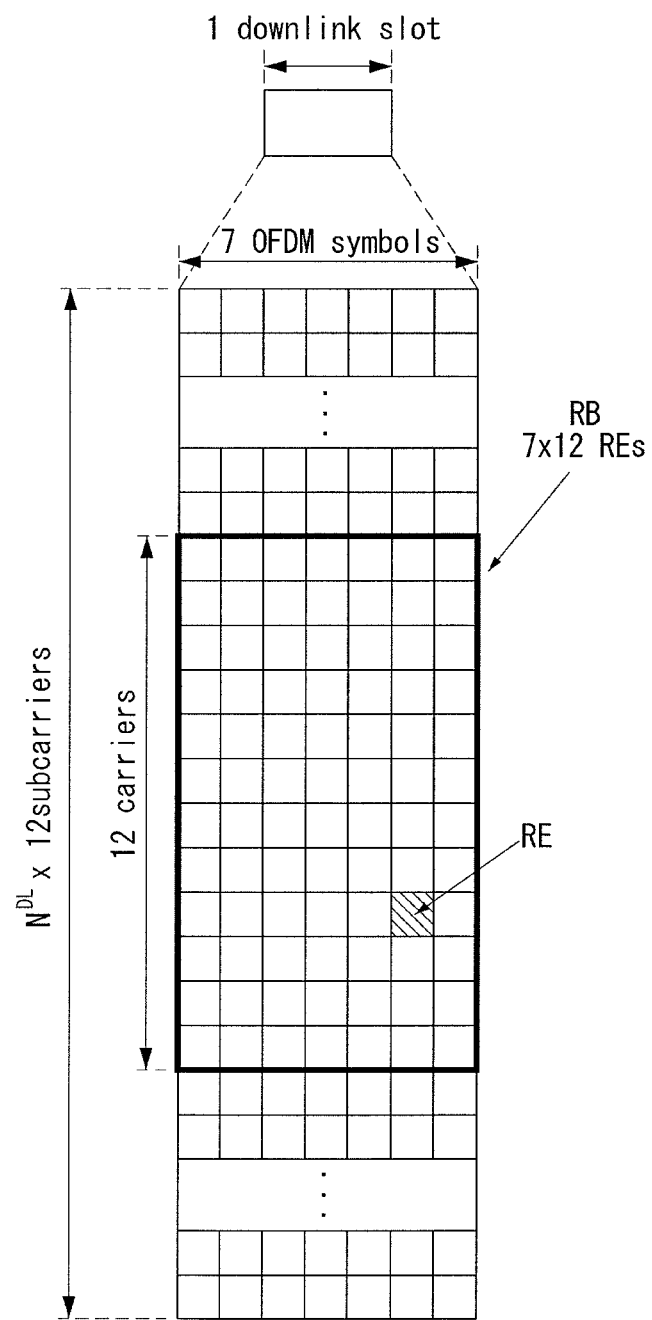

[Figure 6]
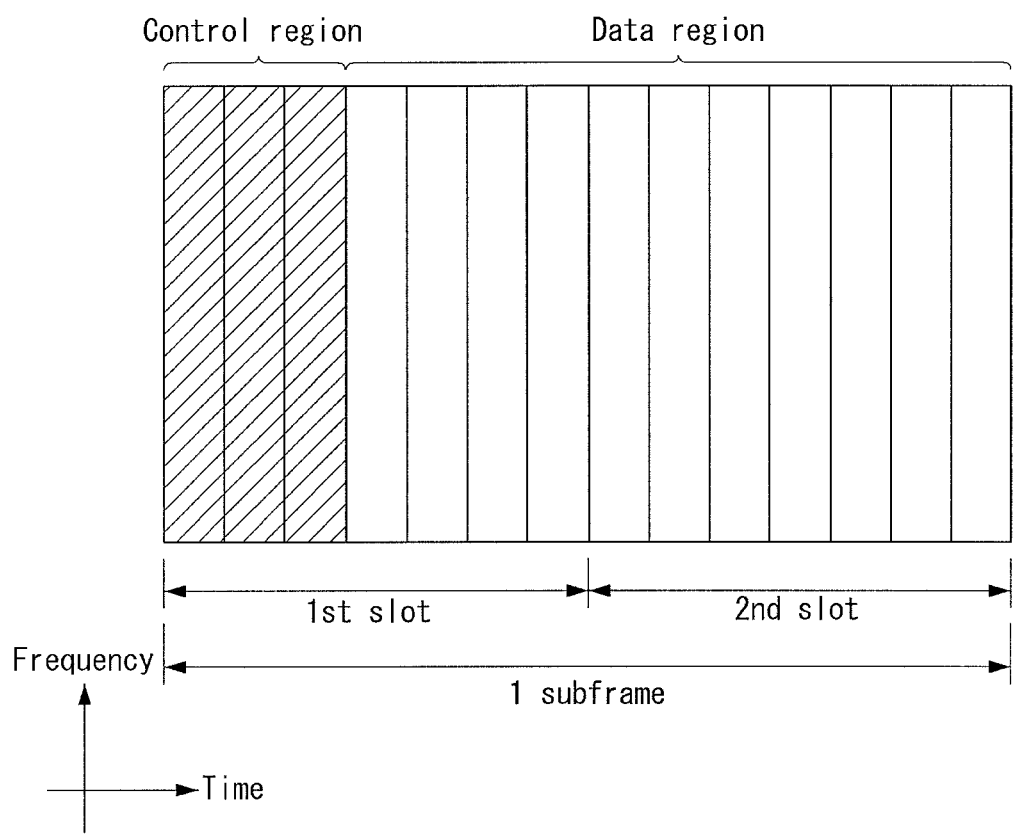

[Figure 7]
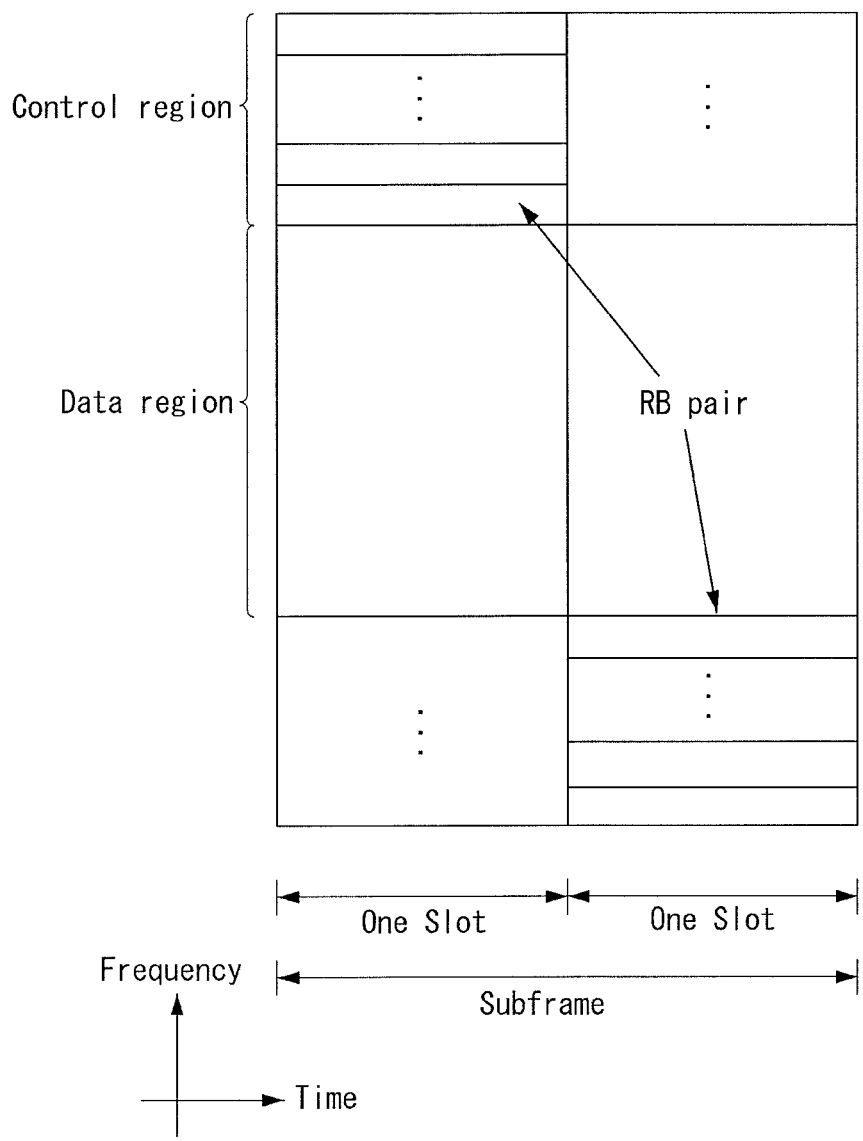

[Figure 8]
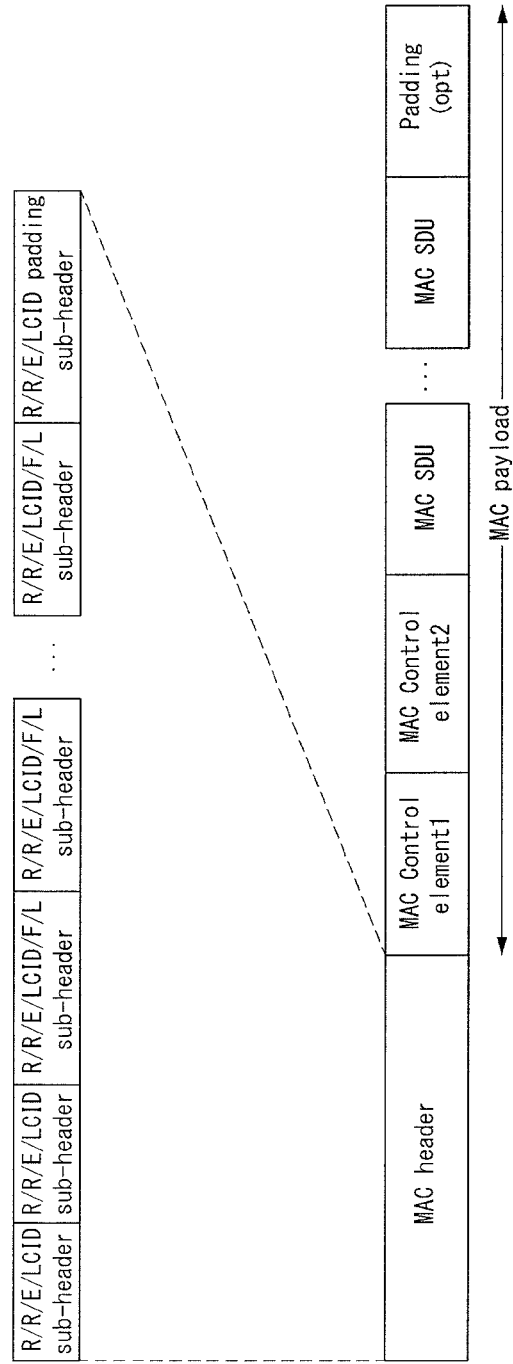

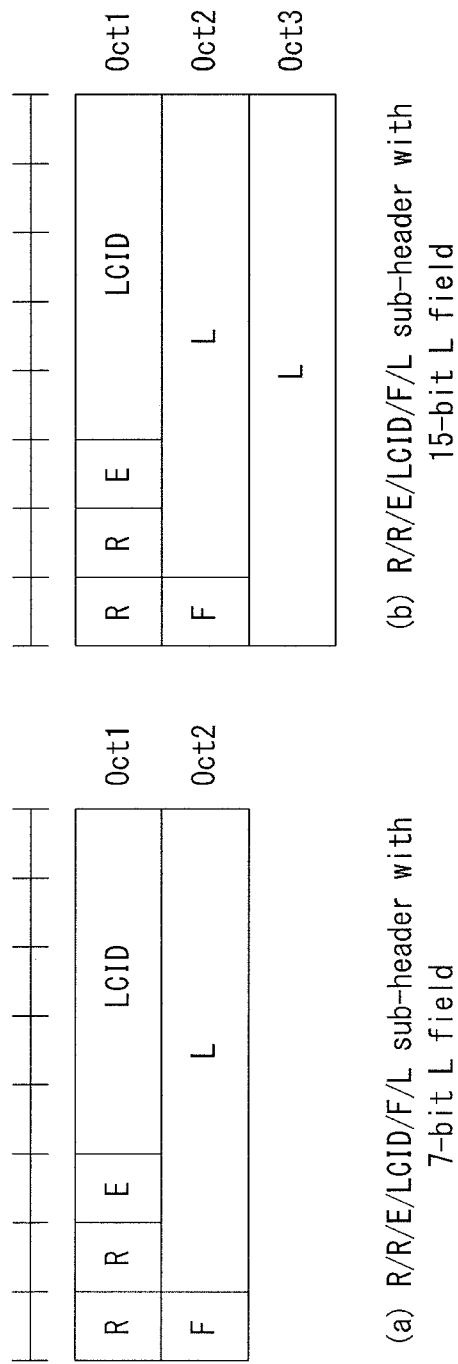

[Figure 10]
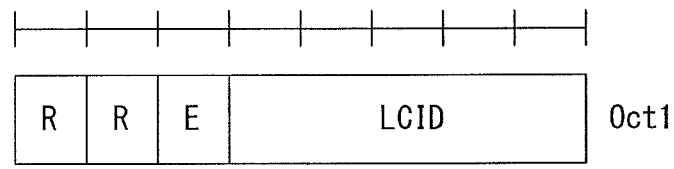
R/R/E/LCID sub-header

[Figure 11]
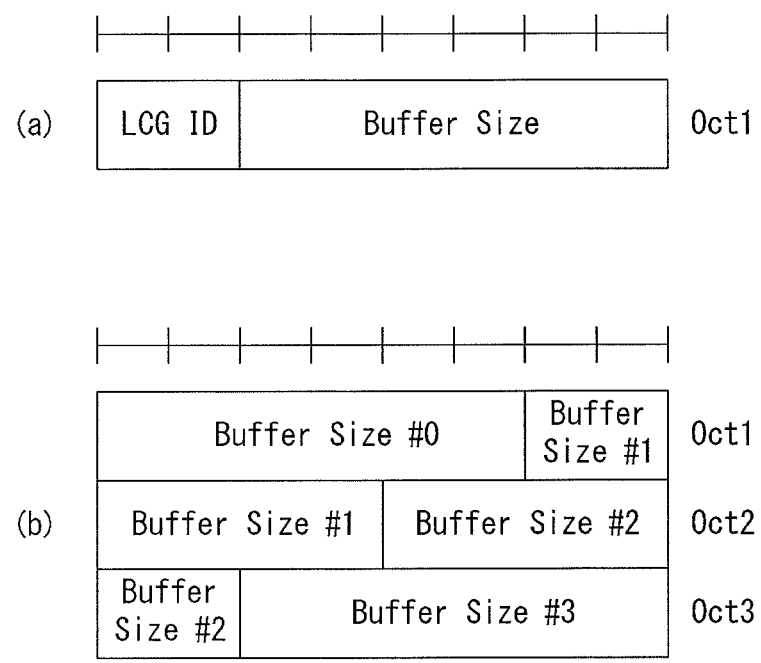

[Figure 12]
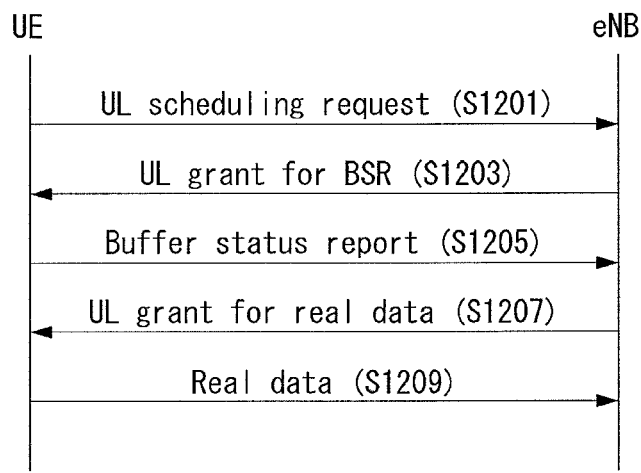
(a)
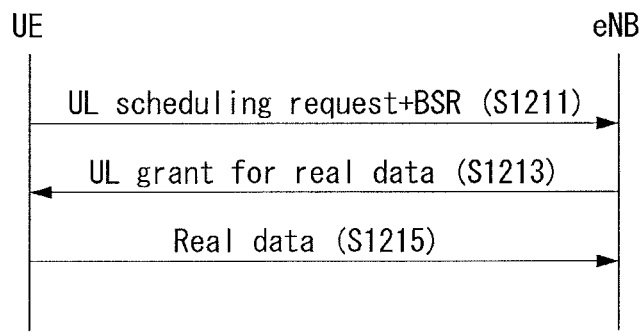
(b)

[Figure 13]
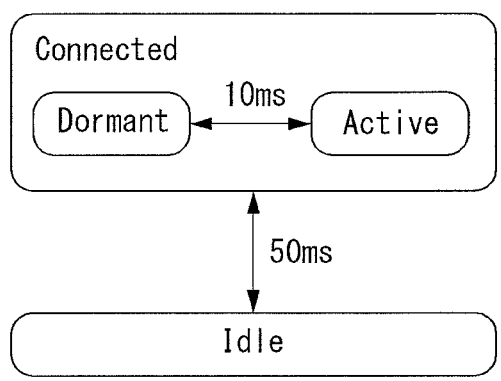

[Figure 14]
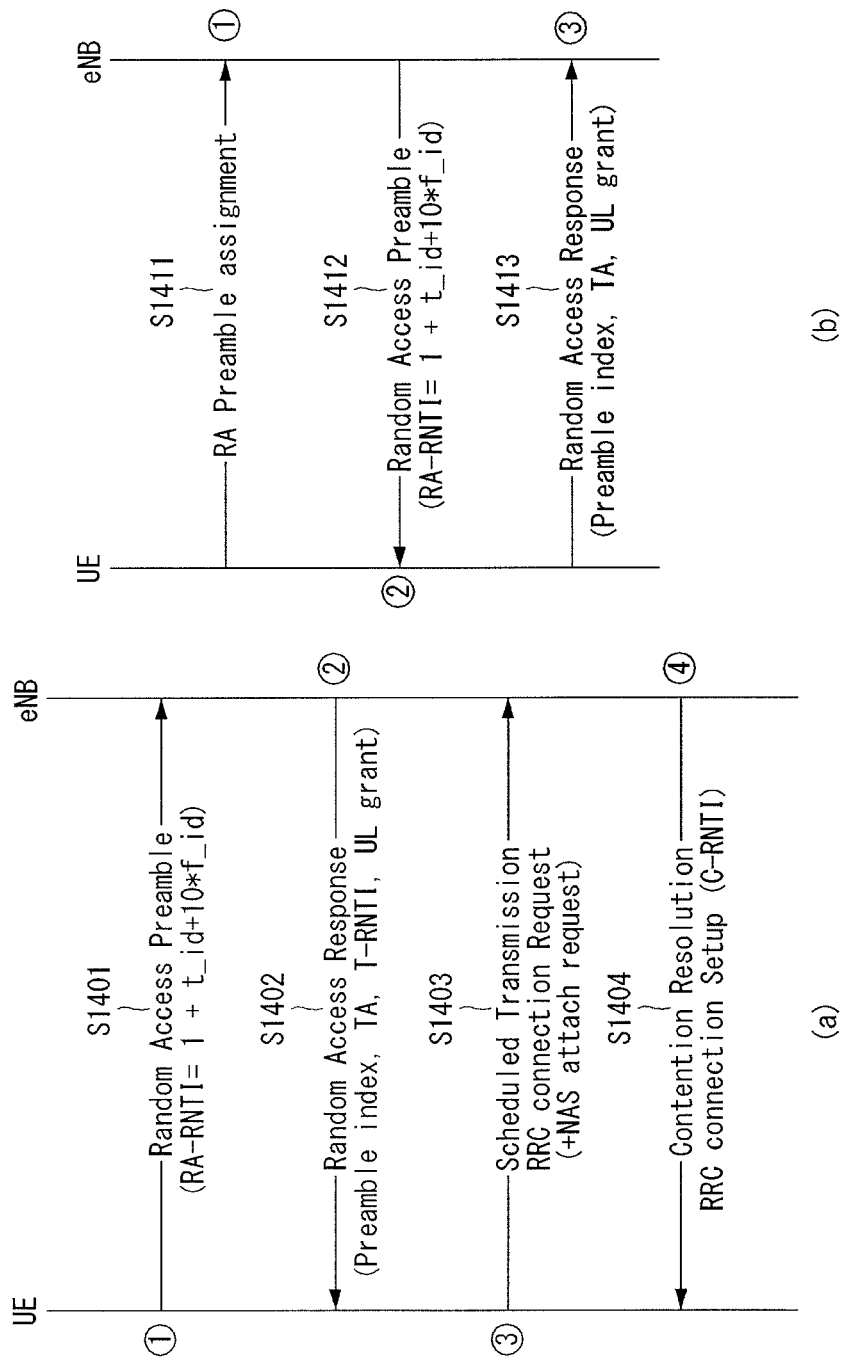

[Figure 15]
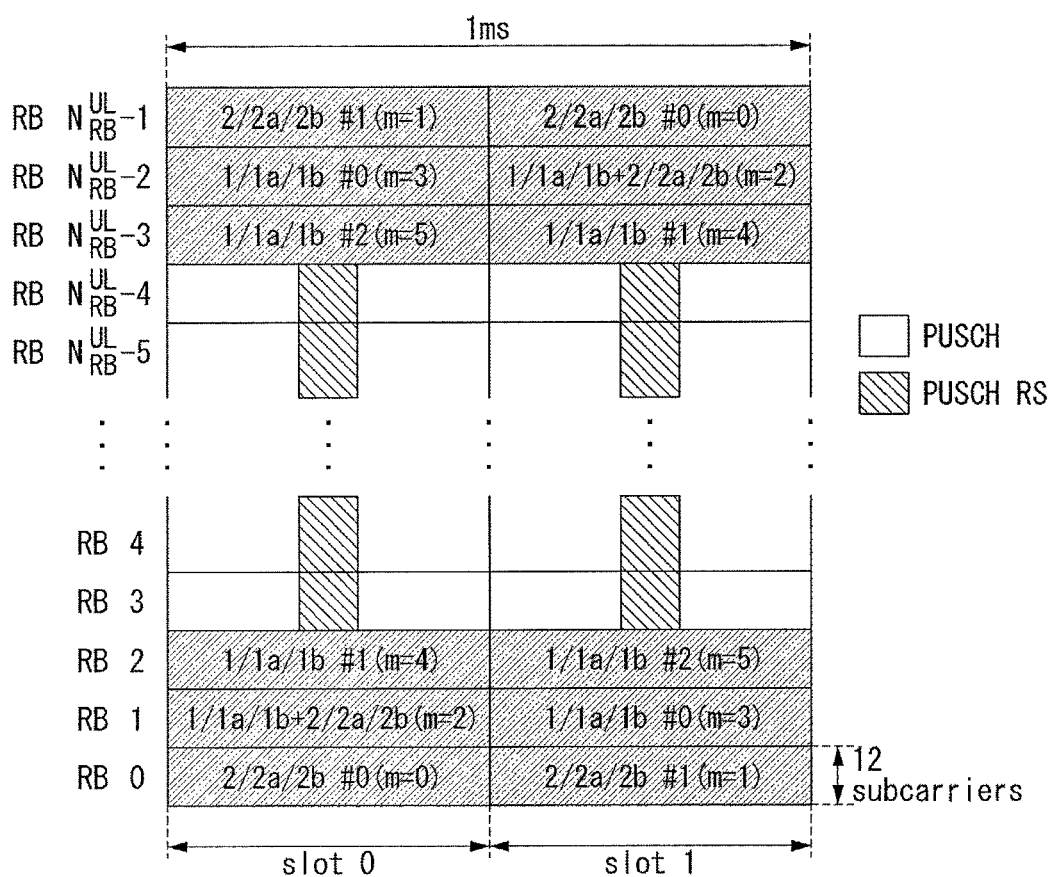

[Figure 16]
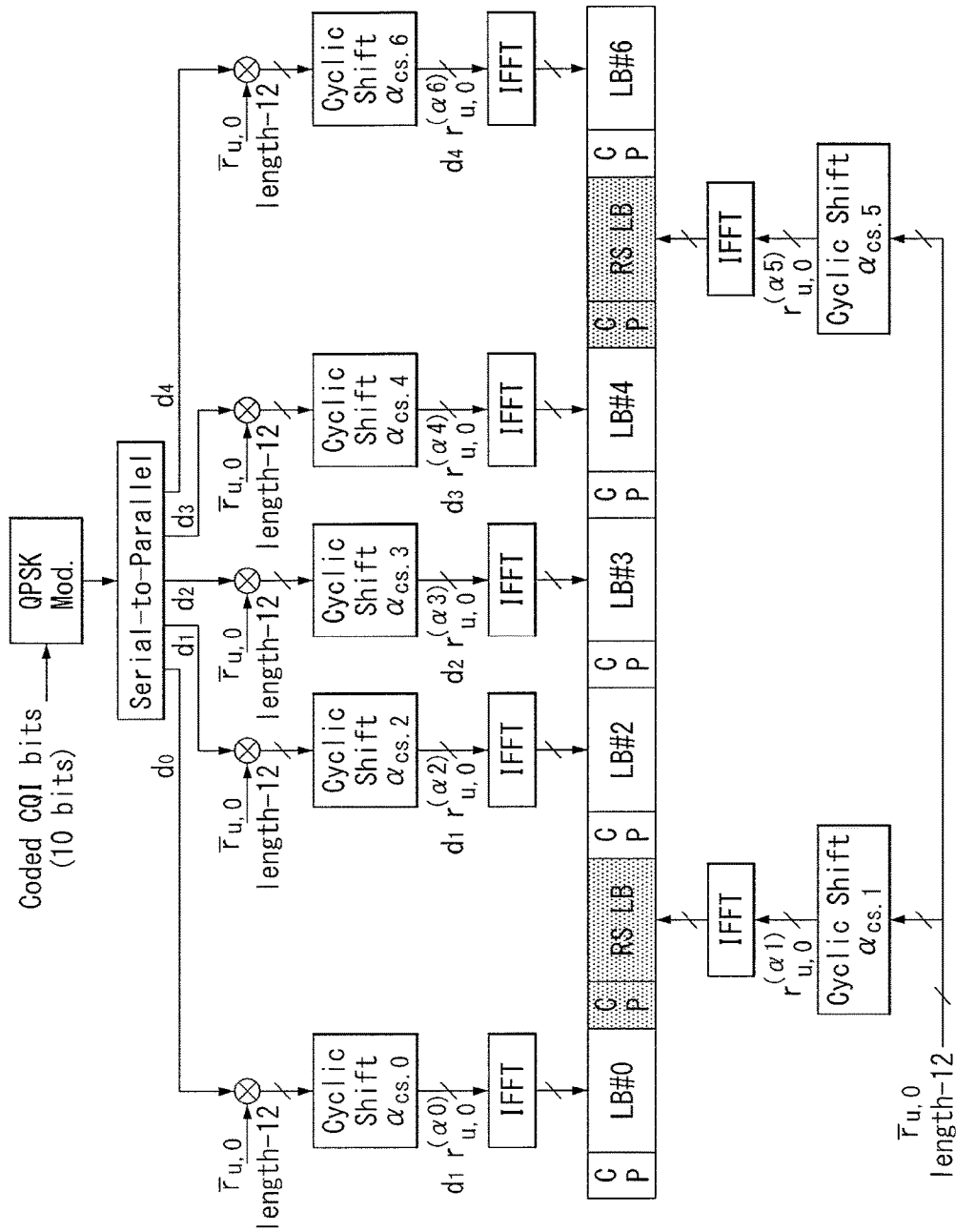

[Figure 17]
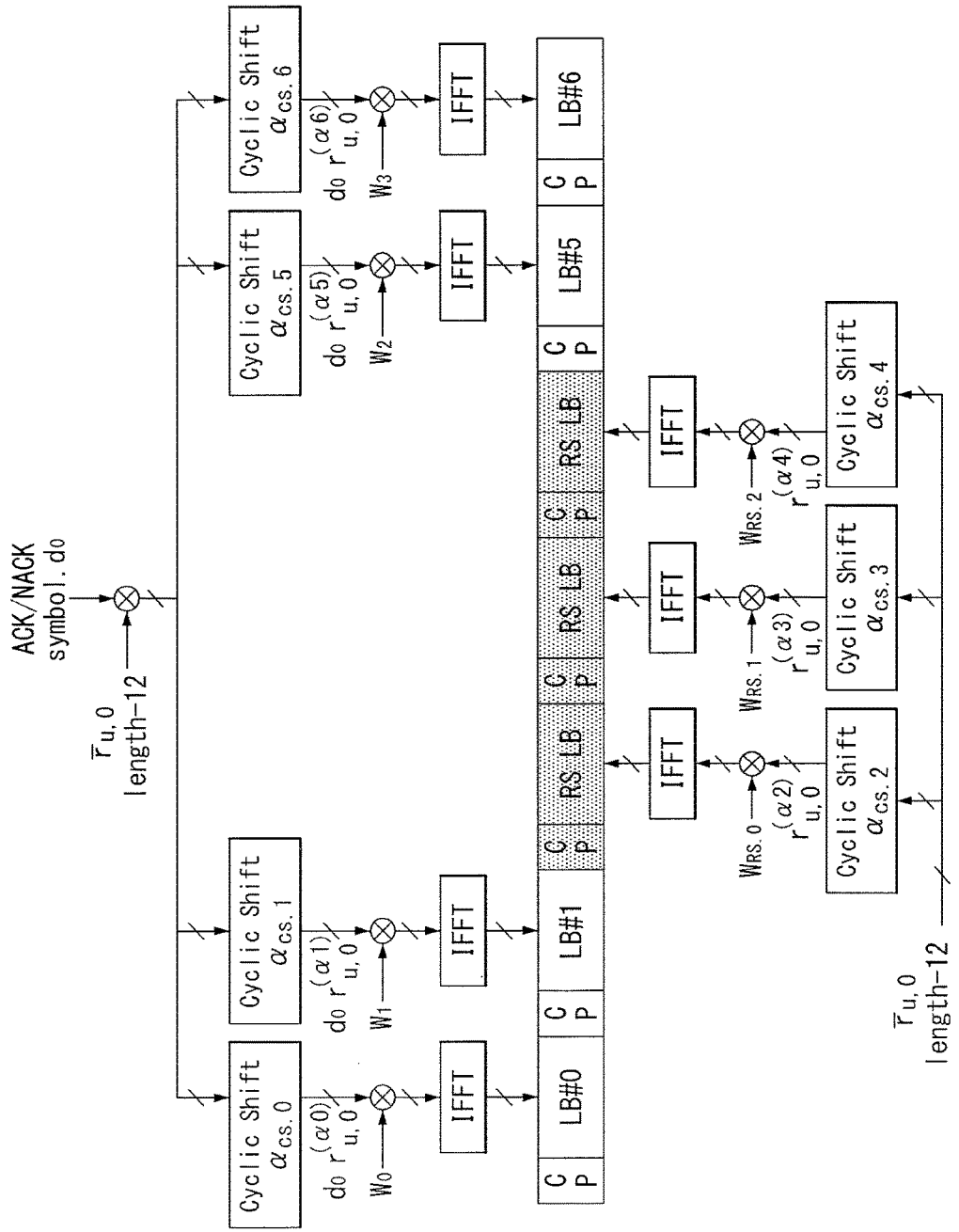

[Figure 18]
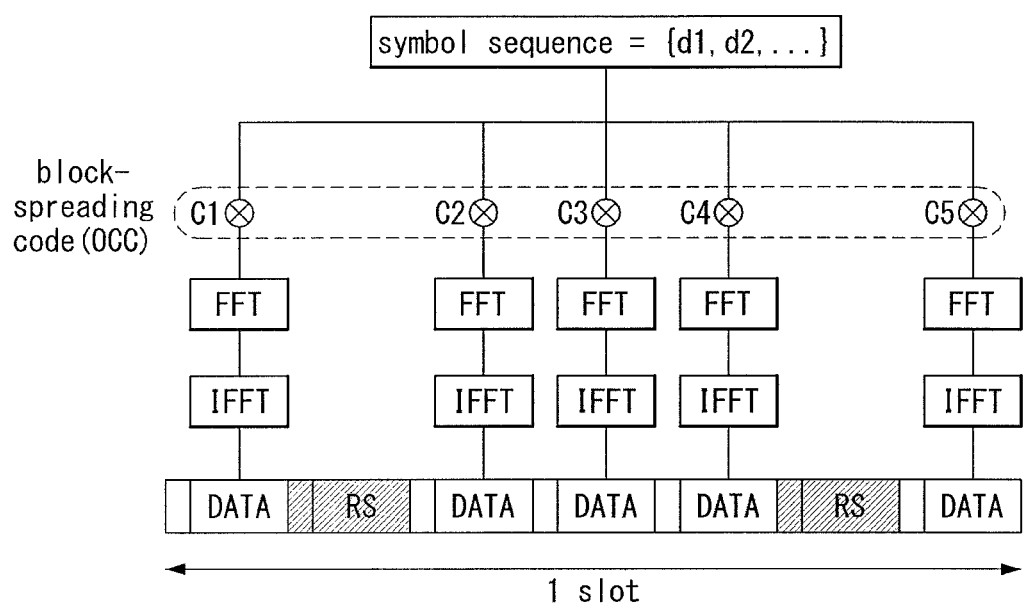

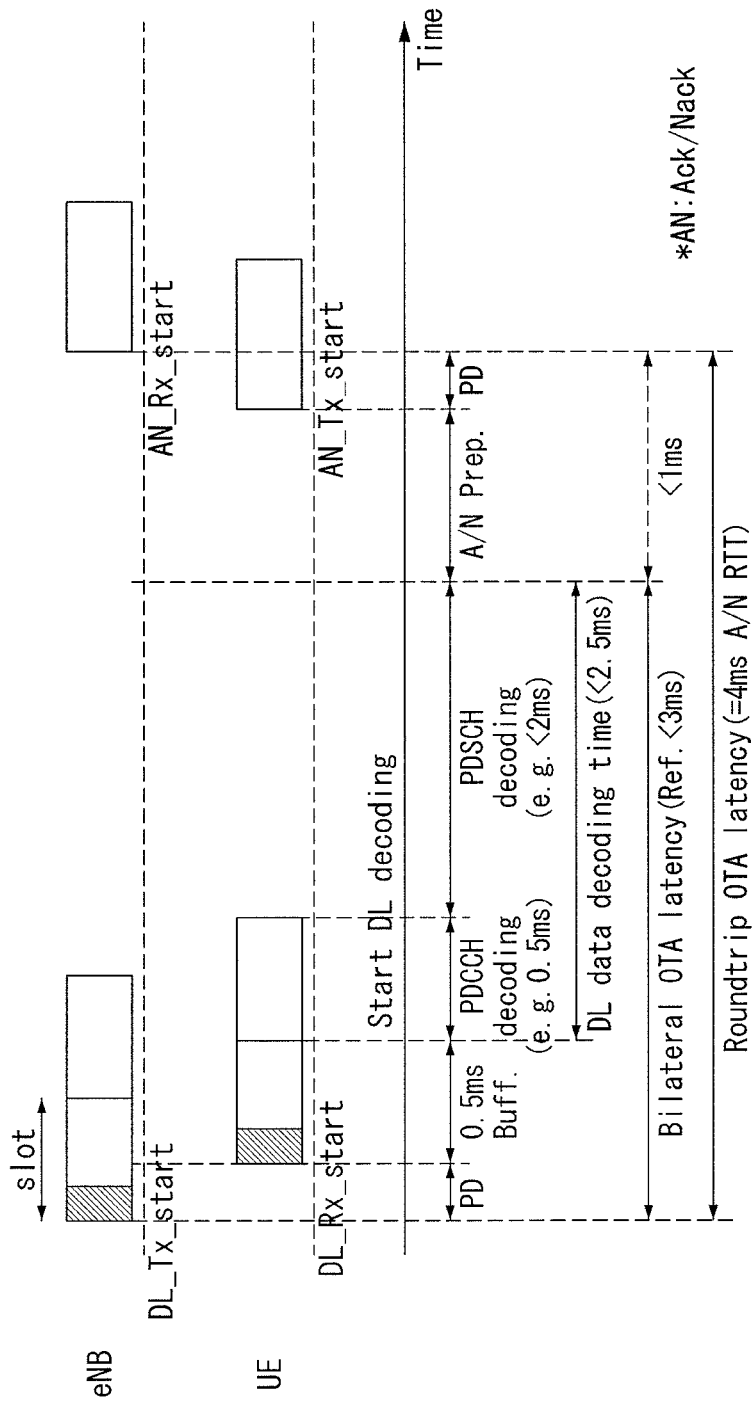
[Figure 19]

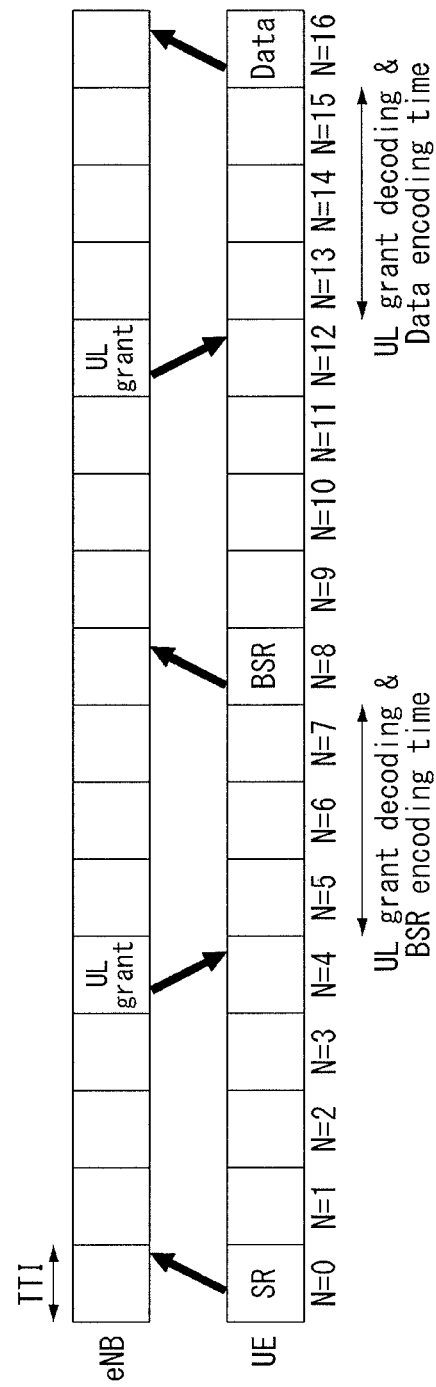
[Figure 20]

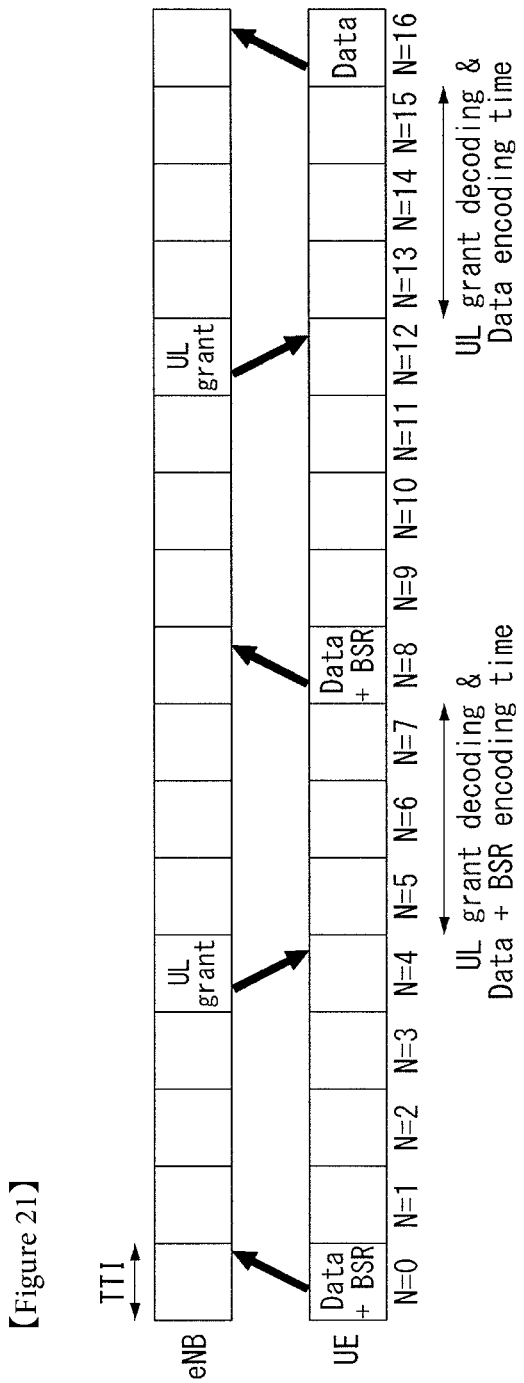
[Figure 21]

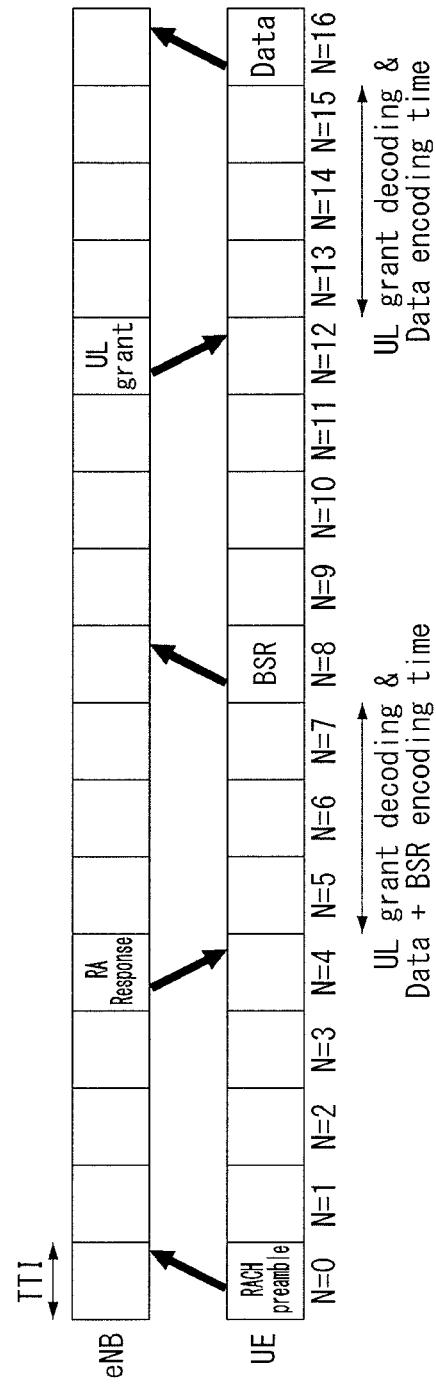
[Figure 22]

[Figure 23]
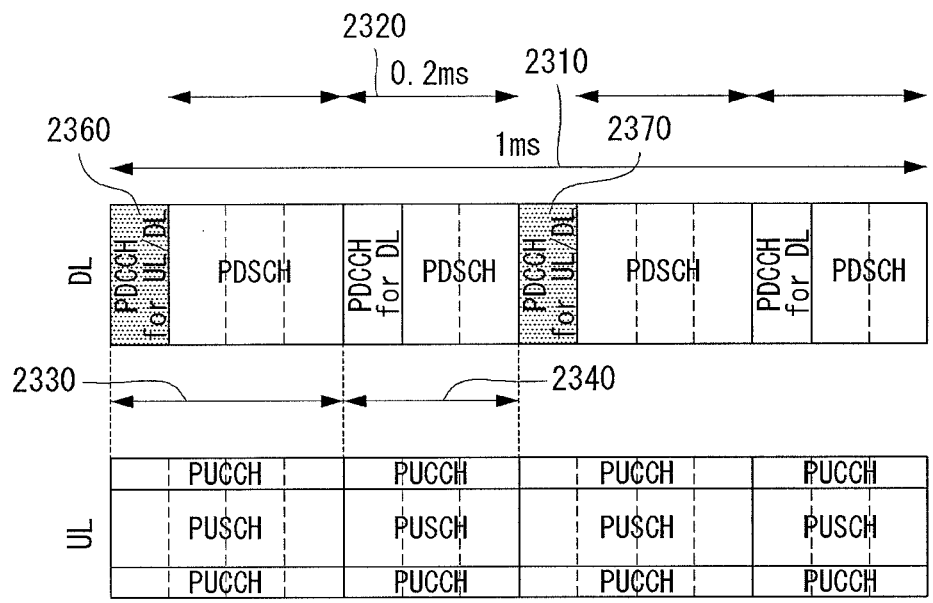
[Figure 24]
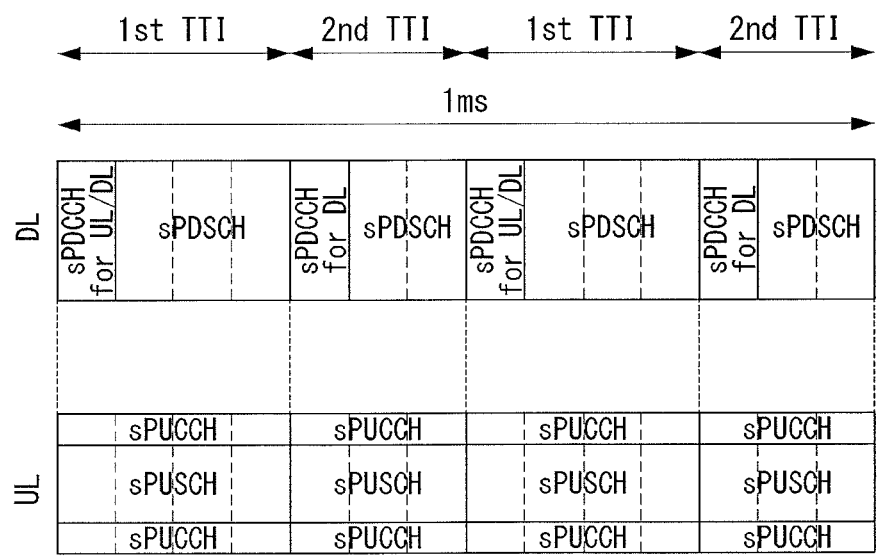

[Figure 25]
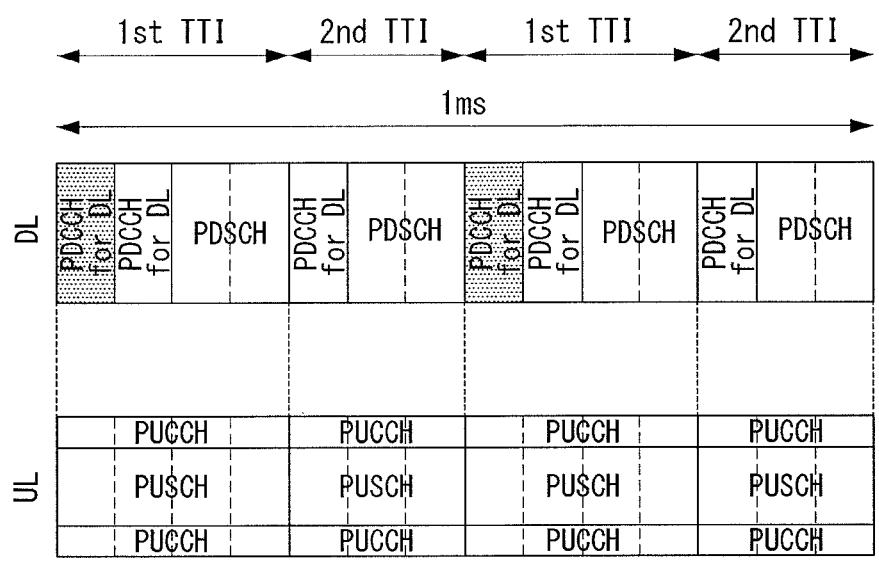

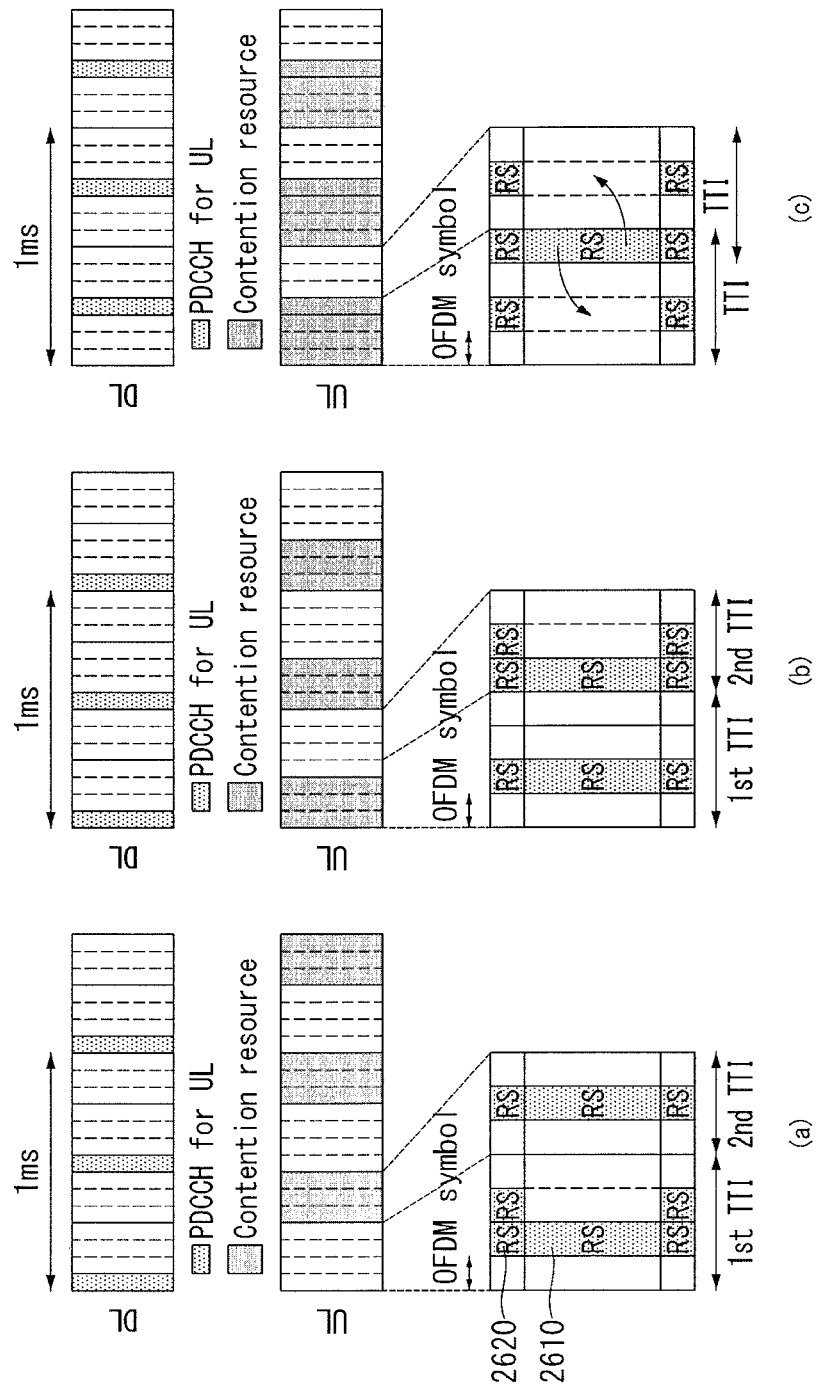
[Figure 26]

【Figure 27】
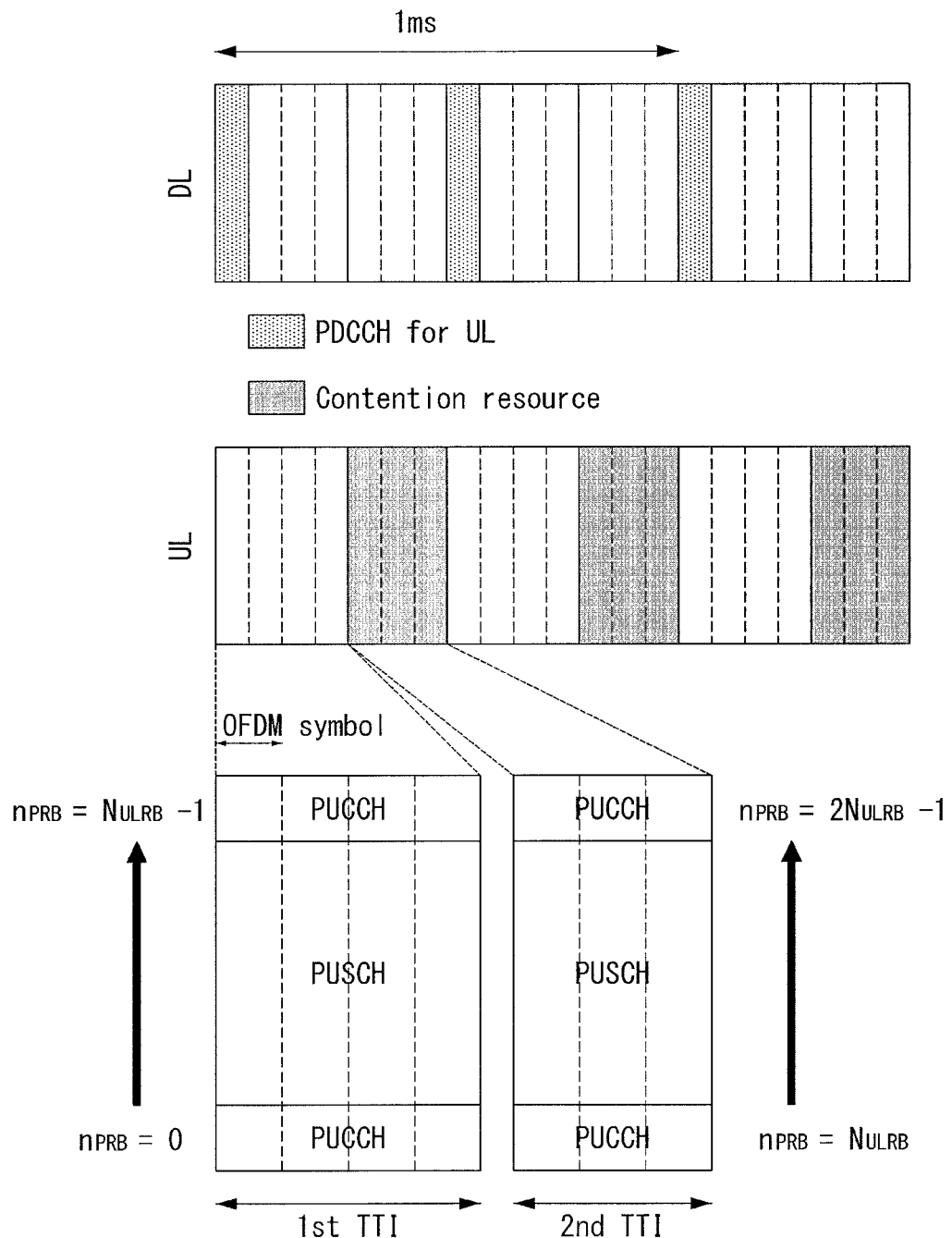

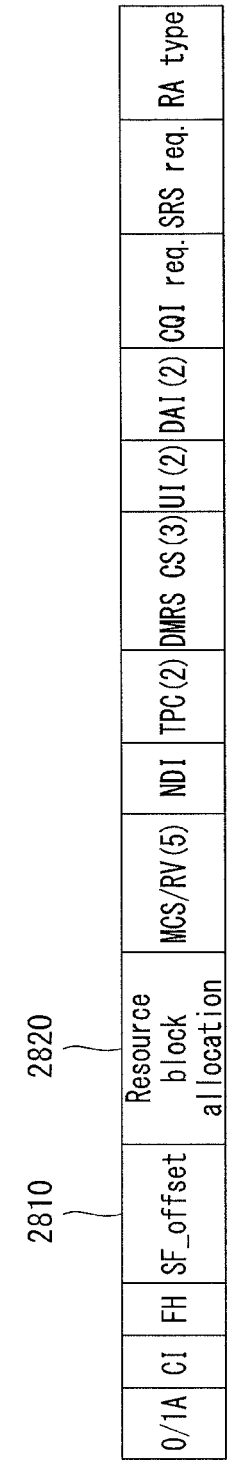
[Figure 28]

【Figure 29】
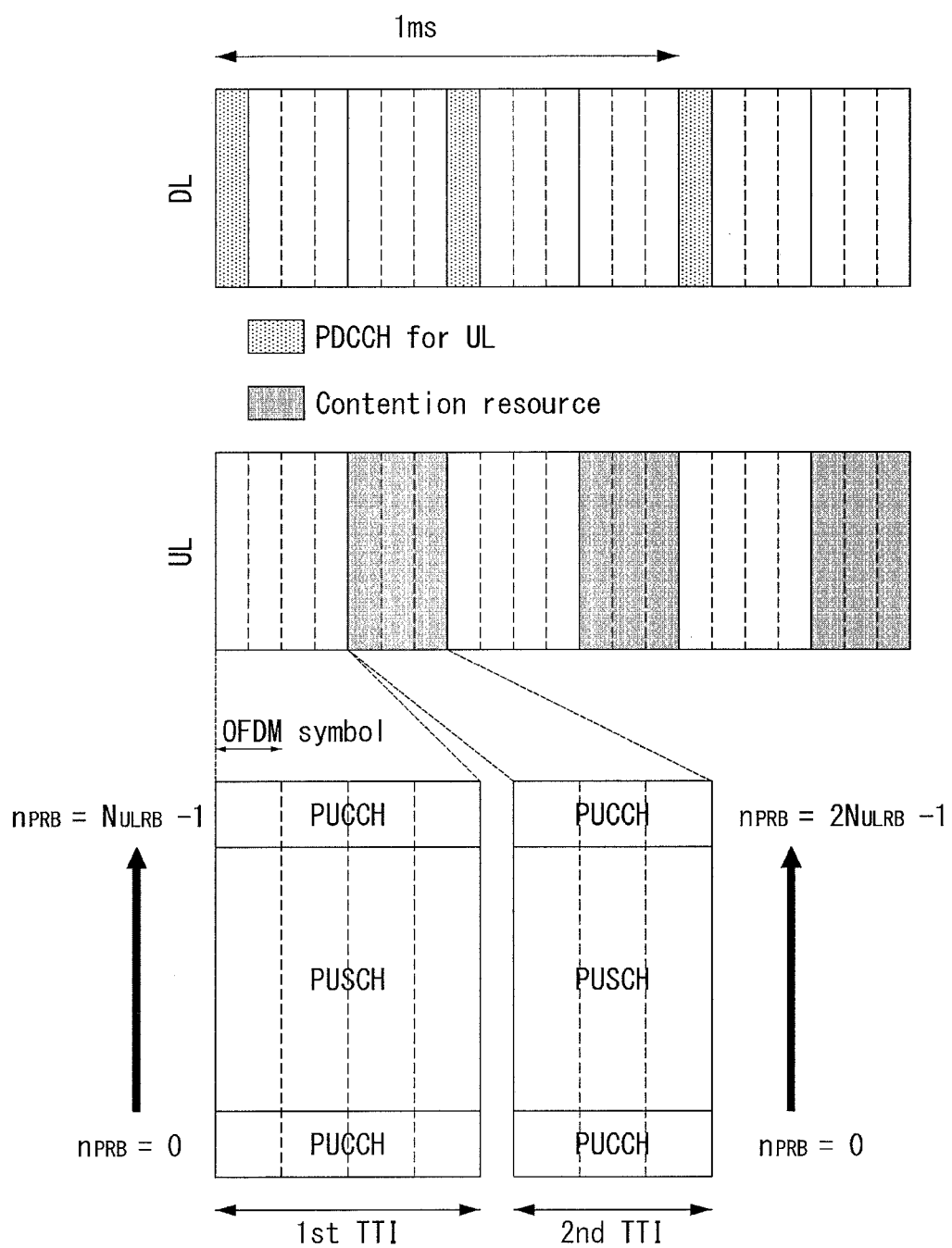

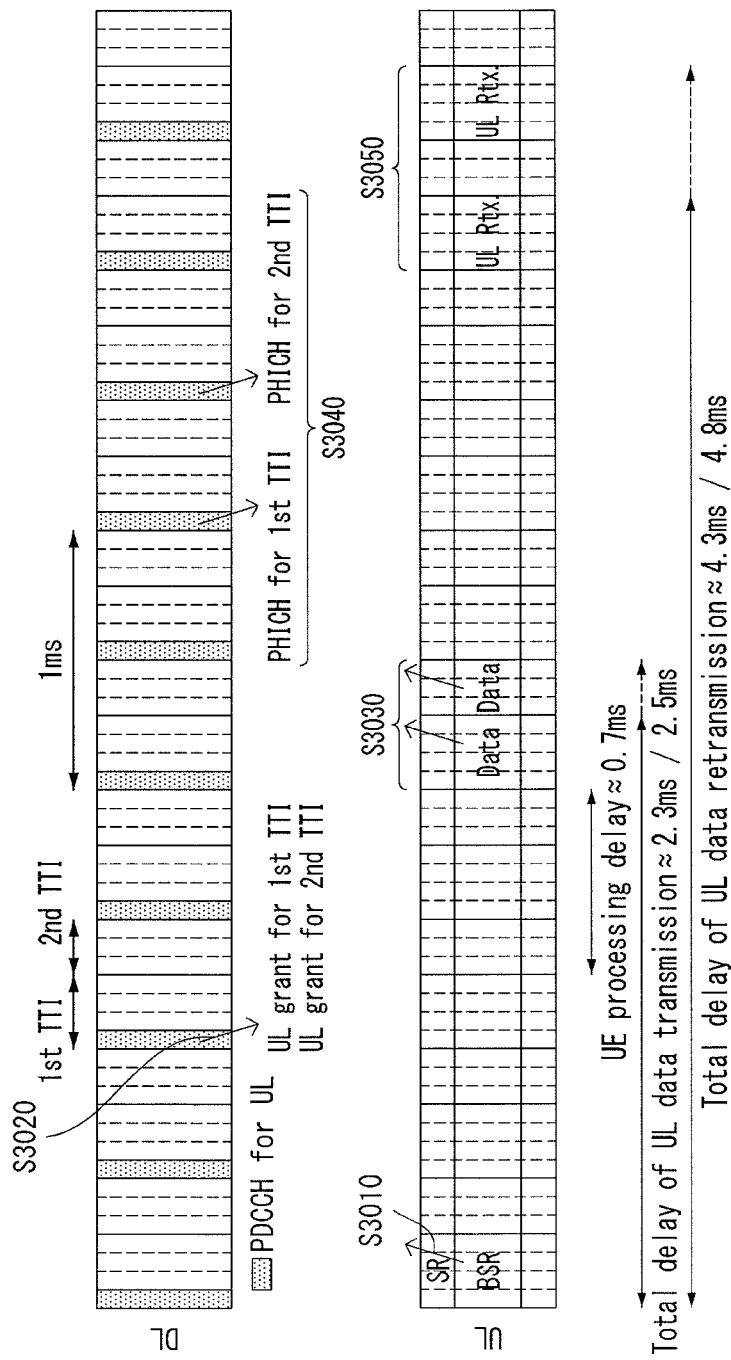
[Figure 30]

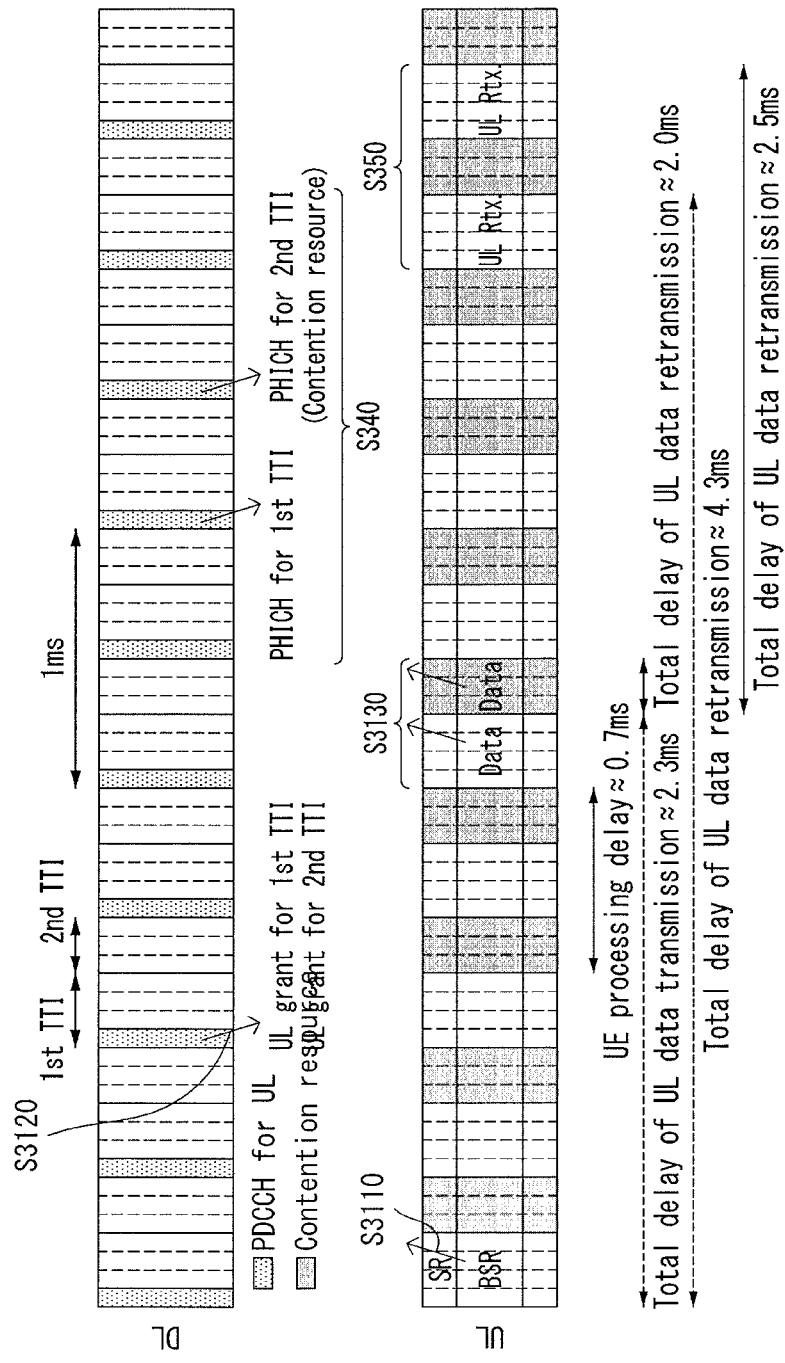
[Figure 31]

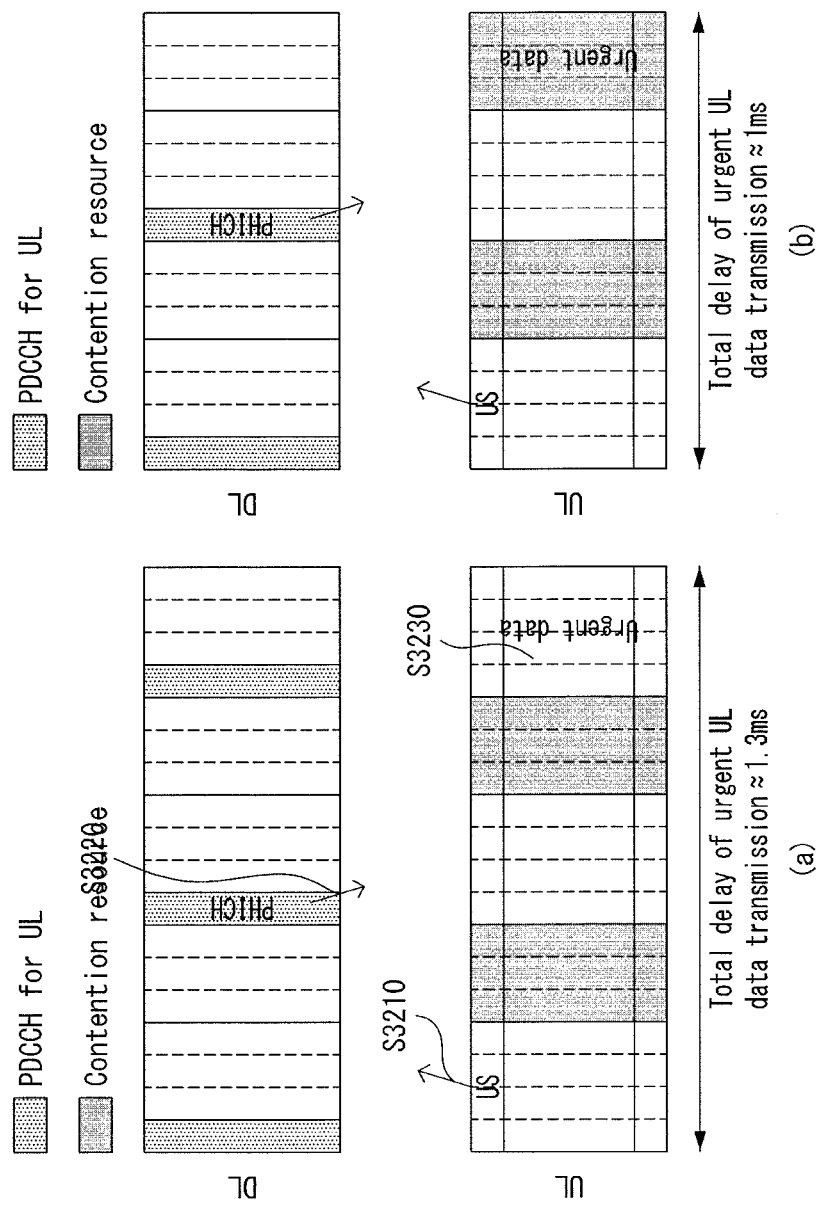
[Figure 32]

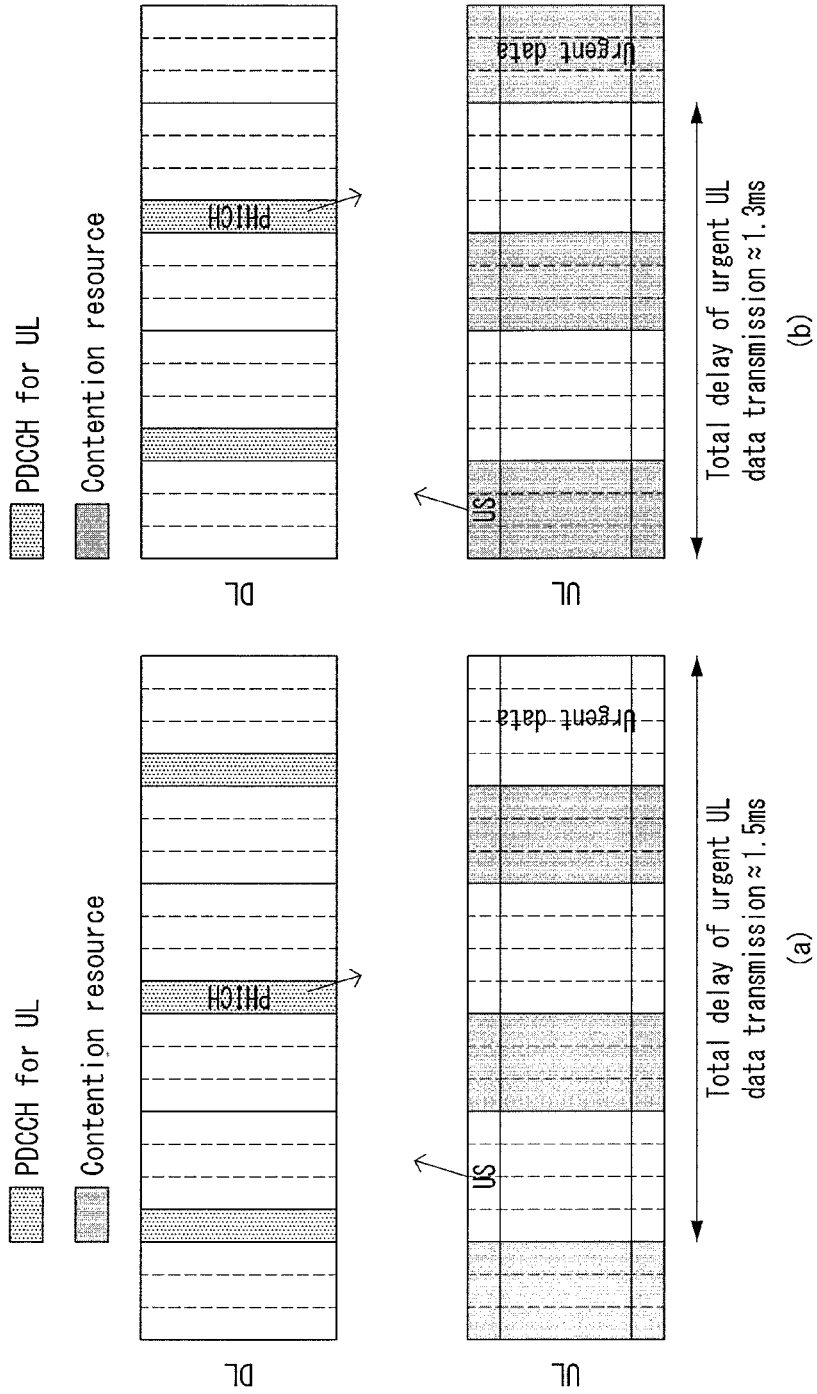
[Figure 33]

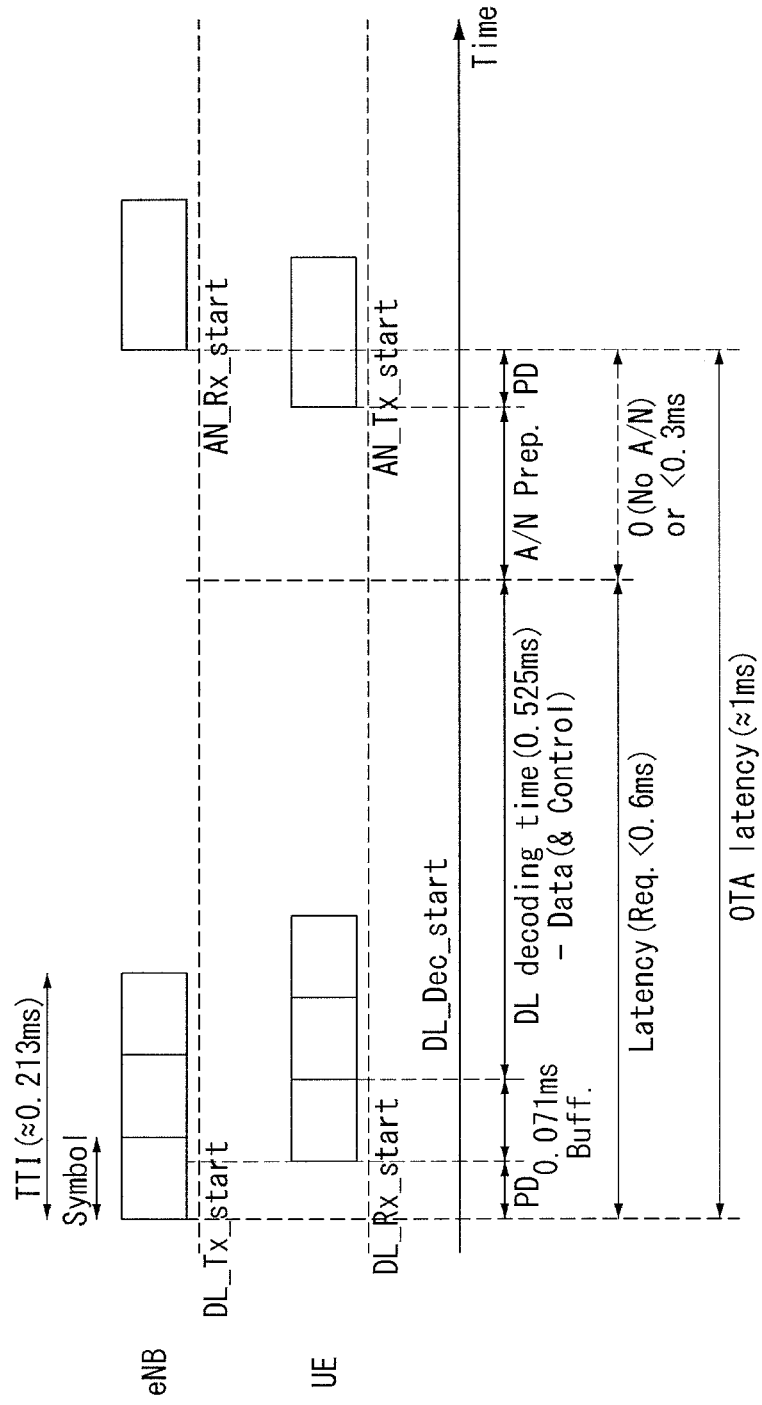
[Figure 34]

[Figure 35]
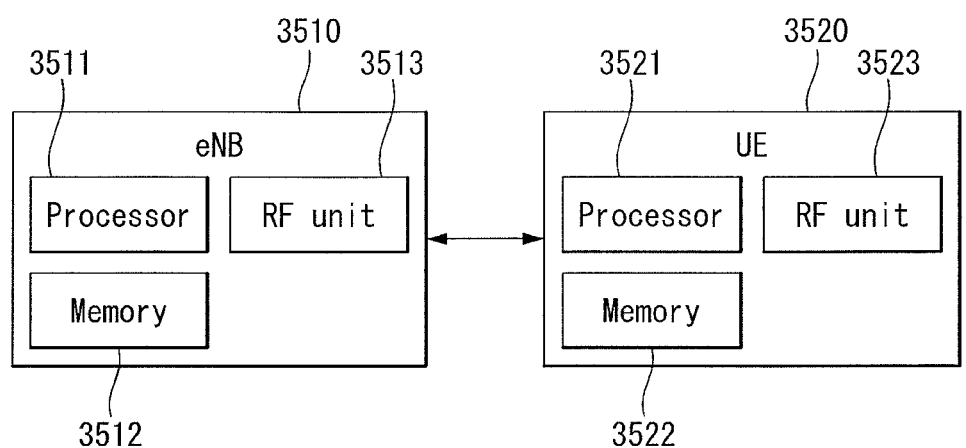

METHOD FOR TRANSMITTING AND RECEIVING DATA IN WIRELESS COMMUNICATION SYSTEM AND APPARATUS FOR THE SAME

CROSS REFERENCE TO RELATED APPLICATIONS

This application is the National Phase of PCT International Application No. PCT/KR2015/013053, filed on Dec. 2, 2015, which claims priority under 35 U.S.C. 119(e) to U.S. Provisional Application No. 62/144,339, filed on Apr. 8, 2015, all of which are hereby expressly incorporated by reference into the present application.

TECHNICAL FIELD

The present invention relates to a wireless communication system and more specifically, a method for a terminal to transmit data to a base station and an apparatus supporting the method

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

SUMMARY OF INVENTION

Technical Problem

An object of the present invention is to provide a method for transmitting uplink/downlink data of a terminal more quickly by defining a new physical frame structure including a short TTI.

Also, an object of the present invention is to provide a contention-based or scheduling-based method for transmitting uplink data by using a defined short TTI.

Also, an object of the present invention is to provide a method for configuring contention resources within a defined short TTI.

Also, an object of the present invention is to provide a method for transmitting a demodulation reference signal (DMRS) from within a defined short TTI.

Also, an object of the present invention is to provide a collision problem that may occur when uplink resources/PHICH resources are mapped by allocating a new physical resource block (PRB) index or by defining an indicator for identifying each short TTI within a DCI format Also, an object of the present invention is to provide a new method for mapping PHICH resources for identifying a PHICH response with respect to each short TTI when the PHICH response is transmitted through the same PHICH.

Technical objects to be achieved by the present invention are not limited to those described above, and other technical objects not mentioned above may also be clearly understood from the descriptions given below by those skilled in the art to which the present invention belongs.

Technical Solution

A method for transmitting and receiving data in a wireless communication system according to the present invention, performed by a terminal comprises transmitting and receiving the data (UL data) to and from a base station through a radio frame, wherein the radio frame includes a downlink (DL) radio frame and an uplink (UL) radio frame; the radio frame includes a legacy TTI (Transmission Time Interval) and short TTI; the legacy TTI includes two slots, each slot belonging to the legacy TTI includes a first short TTI and a second short TTI; the first short TTI and the second short TTI include a data region to which a control region to which a control channel is allocated and a data region to which a data channel is allocated; and downlink control information (DCI) related to uplink transmission of the first short TTI and the second short TTI is allocated to a control region of a first short TTI belonging to the downlink radio frame.

Also, the first short TTI according to the present invention comprises four symbols, and the second shot TTI comprises three symbols.

Also, the control region of the first short TTI according to the present invention comprises one symbol or two symbols, and the control region of the second short TTI comprises one symbol.

Also, the present invention further comprises transmitting a DMRS (Demodulation Reference Signal) to the base station through a short TTI of the uplink radio frame.

Also, the DMRS according to the present invention is transmitted through one symbol within a data region of the first short TTI and the second short TTI.

Also, the DMRS according to the present invention is transmitted through two symbols within a control region of the first short TTI and is transmitted through one symbol within a control region of the second short TTI.

Also, according to the present invention, if the first short overlaps a specific symbol of the second short TTI, the DMRS is transmitted through the overlapping region.

Also, the present invention further comprises receiving from the base station a DCI format including a UL grant through a control region of a first TTI belonging to the downlink radio frame.

Also, the DCI format according to the present invention further comprises an indicator indicating whether the uplink grant is related to resource allocation for the first short TTI or the second short TTI.

Also, the indicator according to the present invention is a subframe offset identifying the first short TTI or the second short TTI.

Also, the DCI format according to the present invention further comprises a resource block assignment field including a resource indication value (RIV), wherein the RIV for the first short TTI is $RIV = N_{RB}^{DL}(L_{CRBs}-1)+RB_{start}$ when $(L_{CRBs}-1) \leq \lfloor N_{RB}^{UL}/2 \rfloor$ and $RIV=N_{RB}^{DL}(N_{RB}^{DL}-L_{CRBs}+1)+(N_{RB}^{DL}-1-RB_{start})$, otherwise while the RIV for the second short TTI is $$RIV = N_{RB}^{UL}\left(\left\lfloor\frac{N_{RB}^{UL}}{2}\right\rfloor + 1\right) + N_{RB}^{DL}(L_{CRBs} - 1) + RB_{start}$$

when $(L_{CRBs}-1) \le \lfloor N_{RB}^{UL}/2 \rfloor$ and $$RIV = N_{RB}^{UL}\left(\left\lfloor\frac{N_{RB}^{UL}}{2}\right\rfloor + 1\right) + N_{RB}^{DL}(N_{RB}^{DL} - L_{CRBs} + 1) + (N_{RB}^{DL} - 1 - RB_{start}),$$

otherwise.

Also, the present invention further comprises determining in which way to transmit the data between a contention-based method and a scheduling-based method.

Also, according to the present invention, when the data is transmitted by the contention-based method, the data is transmitted to the base station through contention resources.

Also, the contention resources according to the present invention belong to the second short TTI.

Also, the present invention further comprises receiving a response to the data transmission from the base station through a PHICH (Physical HARQ Indicator Channel).

Also, the response according to the present invention is a response to at least one of the first short TTI and the second short TTI.

Also, according to the present invention, a response to each of the first short TTI and the second short TTI is mapped to a resource of the PHICH in the form of an index pair of $(n_{PHICH}^{group}, n_{PHICH}^{seq})$.

Also, according to the present invention, $I_{PRB\_RA}$ value with respect to the first short TTI is $I_{PRB\_RA}^{lowest\_index}$ or $I_{PRB\_RA}^{lowest\_index}+1$, and $I_{PRB\_RA}$ value with respect to the second short TTI is $I_{PRB\_RA}^{lowest\_index}+N_{RB}^{UL}$ or $I_{PRB\_RA}^{lowest\_index}+N_{RB}^{UL}+1$.

Also, the present invention comprises transmitting an urgent signal for requesting urgent resource allocation to the base station; receiving the requested urgent resource from the base station through a PHICH channel; and transmitting the data to the base station through the urgent resources received through the PHICH.

Also, a terminal for transmitting and receiving data in a wireless communication system according to the present invention comprises an RF (Radio Frequency) unit for transmitting and receiving a radio signal; and a processor functionally connected to the RF unit, wherein the processor is controlled to transmit and receive the data to and from a base station through a radio frame, wherein the radio frame includes a downlink (DL) radio frame and an uplink (UL) radio frame; the radio frame includes a legacy TTI (Transmission Time Interval) and short TTI; the legacy TTI includes two slots, each slot belonging to the legacy TTI includes a first short TTI and a second short TTI; the first short TTI and the second short TTI include a data region to which a control region to which a control channel is allocated and a data region to which a data channel is allocated; and downlink control information (DCI) related to uplink transmission of the first short TTI and the second short TTI is allocated to a control region of a first short TTI belonging to the downlink radio frame.

Advantageous Effects

The present invention enables a 5G terminal requiring a low latency service to receive DL data by using resources corresponding to sPDSCH, thereby enabling the terminal to receive DL data more quickly by using a short TTI.

Also, even when UL data are not transmitted through contention resources, if UL data are transmitted through a short TTI structure according to the present invention, time for receiving the corresponding UL data may be reduced.

Also, since the present invention defines contention resources within a short TTI, UL data may be transmitted immediately from a base station without involving resource allocation, thereby enabling the UL data to be transmitted more quickly.

Also, by separating scheduling resources from contention resources according to the TDM scheme, the present invention relieves frequency interference on the scheduling resources that may be generated from the contention resources, thereby improving performance of the overall system.

Also, the present invention transmits a control channel for downlink transmission in slot units, thereby reducing overhead due to transmission of downlink control information.

The advantageous effects of the present invention are not limited to those described above, and other advantageous effects not mentioned above may also be clearly understood from the descriptions given below by those skilled in the art to which the present invention belongs.

DESCRIPTION OF DRAWINGS

The accompanying drawings included as part of the detailed description in order to help understanding of the present invention provide embodiments of the present invention and describe the technical characteristics of the present invention along with the detailed description.

FIG. 1 illustrates an example of the network configuration of an evolved universal terrestrial radio access network (E-UTRAN) to which an embodiment of the present invention may be applied.

FIG. 2 illustrates the structure of a radio interface protocol between a UE and an E-UTRAN in a wireless communication system to which an embodiment of the present invention may be applied.

FIG. 3 is a diagram illustrating physical channels used in a 3GPP LTE/LTE-A system to which an embodiment of the present invention may be applied and a known signal transmission method using the physical channels.

FIG. 4 illustrates the structure of a radio frame in 3GPP LTE/LTE-A to which an embodiment of the present invention may be applied.

FIG. 5 is a diagram illustrating a resource grid for a single DL slot in a wireless communication system to which an embodiment of the present invention may be applied.

FIG. 6 illustrates the structure of a DL subframe in a wireless communication system to which an embodiment of the present invention may be applied.

FIG. 7 illustrates the structure of an UL subframe in a wireless communication system to which an embodiment of the present invention may be applied.

FIG. 8 is a diagram illustrating an example of an MAC PDU used in an MAC entity in a wireless communication system to which an embodiment of the present invention may be applied.

FIGS. 9 and 10 illustrate the subheader of the MAC PDU in a wireless communication system to which an embodiment of the present invention may be applied.

FIG. 11 is a diagram illustrating an example of the format of an MAC control element for a buffer status report in a wireless communication system to which an embodiment of the present invention may be applied.

FIG. 12 is a diagram illustrating an example of a process of allocating UL resources to a UE in a wireless communication system to which an embodiment of the present invention may be applied.

FIG. 13 is a diagram illustrating latency in a control plane (C-plane) that is required in 3GPP LTE-A to which an embodiment of the present invention may be applied.

FIG. 14 is a diagram illustrating an example of a random access procedure to which an embodiment of the present invention may be applied.

FIG. 15 shows an example of a form in which PUCCH formats are mapped to PUCCH regions in a wireless communication system to which an embodiment of the present invention may be applied.

FIG. 16 shows the structure of a CQI channel in the case of a common CP in a wireless communication system to which an embodiment of the present invention may be applied.

FIG. 17 shows the structure of an ACK/NACK channel in the case of a common CP in a wireless communication system to which an embodiment of the present invention may be applied.

FIG. 18 shows an example in which five SC-FDMA symbols are generated and transmitted for one slot in a wireless communication system to which an embodiment of the present invention may be applied.

FIG. 19 illustrates latency in wireless transmission and reception in the 3GPP LTE/LTE-A system.

FIGS. 20 and 21 illustrate one example of a method for transmitting actual data through a scheduling request and BSR procedure.

FIG. 22 illustrates one example of a method for transmitting actual data through the RACH procedure.

FIGS. 23 to 25 illustrate examples of a short TTI frame structure according to the present invention.

FIG. 26 illustrates one example of a DMRS position in the UL frame structure based on a short TTI according to the present invention.

FIG. 27 illustrates one example of a method for allocating a new physical resource block index according to the present invention.

FIG. 28 illustrates a structure of a new DCI format 0 according to the present invention.

FIG. 29 illustrates one example of a method for allocating a PRB index by using a resource indication value (RIV) according to the present invention.

FIG. 30 illustrates one example of a method for transmitting and receiving uplink data by using a physical frame structure according to the present invention.

FIG. 31 illustrates another example of a method for transmitting and receiving uplink data by using a physical frame structure according to the present invention.

FIG. 32 and FIG. 33 illustrate still other examples of a method for transmitting and receiving uplink data by using a physical frame structure according to the present invention.

FIG. 34 illustrates latency in wireless transmission and reception in the short TTI radio frame structure according to the present invention.

FIG. 35 illustrates a block diagram of a wireless communication device to which the methods according to the present invention may be applied.

BEST MODE

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal.

In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term 'eNB' may be replaced with the term 'fixed station', 'base station (BS)', 'Node B', 'base transceiver system (BTS),', 'access point (AP)', etc.

The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', wireless device, etc.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

For clarity, this application focuses on the 3GPP LTE/LTE-A system. However, the technical features of the present invention are not limited thereto.

General System to which the Present Invention May be Applied

FIG. 1 illustrates a schematic structure a network structure of an evolved universal mobile telecommunication system (E-UMTS) to which the present invention can be applied.

An E-UMTS system is an evolved version of the UMTS system. For example, the E-UMTS may be also referred to as an LTE/LTE-A system. The E-UMTS is also referred to as a Long Term Evolution (LTE) system.

The E-UTRAN consists of eNBs, providing the E-UTRA user plane and control plane protocol terminations towards the UE. The eNBs are interconnected with each other by means of the X2 interface. The X2 user plane interface (X2-U) is defined between eNBs. The X2-U interface provides non guaranteed delivery of user plane packet data units (PDUs). The X2 control plane interface (X2-CP) is defined between two neighbour eNBs. The X2-CP performs following functions: context transfer between eNBs, control of user plane tunnels between source eNB and target eNB, transfer of handover related messages, uplink load management and the like. Each eNB is connected to User Equipments (UEs) through a radio interface and is connected to an Evolved Packet Core (EPC) through an S1 interface. The S1 user plane interface (S1-U) is defined between the eNB and the serving gateway (S-GW). The S1-U interface provides non guaranteed delivery of user plane PDUs between the eNB and the S-GW. The S1 control plane interface (S1-MME) is defined between the eNB and the MME (Mobility Management Entity). The S1 interface performs following functions: EPS (Enhanced Packet System) Bearer Service Management function, NAS (Non-Access Stratum) Signaling Transport function, Network Sharing Function, MME Load balancing Function and the like. The S1 interface supports a many-to-many relation between MMEs/S-GWs and eNBs.

FIG. 2 illustrates the configurations of a control plane and a user plane of a radio interface protocol between the E-UTRAN and a UE in the wireless communication system to which the present invention can be applied.

FIG. 2(a) shows the respective layers of the radio protocol control plane, and FIG. 2(b) shows the respective layers of the radio protocol user plane.

Referring to the FIG. 2, the protocol layers of a radio interface protocol between the E-UTRAN and a UE can be divided into an L1 layer (first layer), an L2 layer (second layer), and an L3 layer (third layer) based on the lower three layers of the Open System Interconnection (OSI) reference model widely known in communication systems. The radio interface protocol is divided horizontally into a physical layer, a data link layer, and a network layer, and vertically into a user plane for data transmission and a control plane for signaling.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The MAC layer of the second layer provides a service to a Radio Link Control (RLC) layer, located above the MAC layer, through a logical channel. The MAC layer plays a role in mapping various logical channels to various transport channels. And, the MAC layer also plays a role as logical channel multiplexing in mapping several logical channels to one transport channel.

The RLC layer of the second layer supports reliable data transmission. The RLC layer performs segmentation and concatenation on data received from an upper layer to play a role in adjusting a size of the data to be suitable for a lower layer to transfer the data to a radio section. And, the RLC layer provides three kinds of RLC modes including a transparent mode (TM), an unacknowledged mode (UM) and an acknowledged mode (AM) to secure various kinds of QoS demanded by each radio bearer (RB). In particular, the AM RLC performs a retransmission function through automatic repeat and request (ARQ) for the reliable data transfer. The functions of the RLC layer may also be implemented through internal functional blocks of the MAC layer. In this case, the RLC layer need not be present.

A packet data convergence protocol (PDCP) layer of the second layer performs a header compression function for reducing a size of an IP packet header containing relatively large and unnecessary control information to efficiently transmit such an IP packet as IPv4 and IPv6 in a radio section having a small bandwidth. This enables a header part of data to carry mandatory information only to play a role in increasing transmission efficiency of the radio section. Moreover, in the LTE/LTE-A system, the PDCP layer performs a security function as well. This consists of ciphering for preventing data interception conducted by a third party and integrity protection for preventing data manipulation conducted by a third party.

A Radio Resource Control (RRC) layer located at the bottom of the third layer is defined only in the control plane and is responsible for control of logical, transport, and physical channels in association with configuration, re-configuration, and release of Radio Bearers (RBs). The RB is a logical path that the second layer provides for data communication between the UE and the E-UTRAN. To accomplish this, the RRC layer of the UE and the RRC layer of the network exchange RRC messages. To Configure of Radio Bearers means that the radio protocol layer and the characteristic of channels are defined for certain service and that each of specific parameters and operating method are configured for certain service. The radio bearer can be divided signaling radio bearer (SRB) and data radio bearer (DRB). The SRB is used as a path for transmission RRC messages in the control plane, and the DRB is used as a path for transmission user data in the user plane.

A Non-Access Stratum (NAS) layer located above the RRC layer performs functions such as session management and mobility management.

One cell of the eNB is set to use a bandwidth such as 1.25, 2.5, 5, 10 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages, and a downlink Shared Channel (DL-SCH) for transmission of user traffic or control messages. User traffic or control messages of a downlink multicast or broadcast service may be transmitted through DL-SCH and may also be transmitted through a downlink multicast channel (MCH). Uplink transport channels for transmission of data from the UE to the network include a Random Access Channel (RACH) for transmission of initial control messages and an uplink SCH (UL-SCH) for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a dedicated control channel (DCCH), a Multicast Control Channel (MCCH), a dedicated traffic channel (DTCH), and a Multicast Traffic Channel (MTCH).

As an downlink physical channel for transmitting information forwarded on an downlink transport channel to a radio section between a network and a user equipment, there is a physical downlink shared channel (PDSCH) for transmitting information of DL-SCH, a physical control format indicator channel (PDFICH) for indicating the number of OFDM symbols used for transmitting a physical downlink control channel (PDCCH), a physical HARQ (hybrid automatic repeat request) indicator channel (PHICH) for transmitting HARQ ACK (Acknowledge)/NACK (Non-acknowledge) as response to UL transmission or a PDCCH for transmitting such control information, as DL grant indicating resource allocation for transmitting a Paging Channel (PCH) and DL-SCH, information related to HARQ, UL grant indicating resource allocation for transmitting a UL-SCH and like that. As an uplink physical channel for transmitting information forwarded on an uplink transport channel to a radio section between a network and a user equipment, there is a physical uplink shared channel (PUSCH) for transmitting information of UL-SCH, a physical random access channel (PRACH) for transmitting RACH information or a physical uplink control channel (PUCCH) for transmitting such control information, which is provided by first and second layers, as HARQ ACK/NACK (Non-acknowledge), scheduling request (SR), channel quality indicator (CQI) report and the like.

The NAS state model is based on a two-dimensional model which consists of EPS Mobility Management (EMM) states and of EPS Connection Management (ECM) states. The EMM states describe the mobility management states that result from the mobility management procedures e.g., Attach and Tracking Area Update procedures. The ECM states describe the signaling connectivity between the UE and the EPC.

In detail, in order to manage mobility of a UE in NAS layers positioned in control planes of the UE and an MME, an EPS mobility management REGISTERED (EMM-REGISTERED) state and an EMM-DEREGISTERED state may be defined. The EMM-REGISTERED state and the EMM-DEREGISTERED state may be applied to the UE and the MME.

The UE is in the EMM deregistered state, like a state in which power of the UE is first turned on, and in order for the UE to access a network, a process of registering in the corresponding network is performed through an initial access procedure. When the access procedure is successfully performed, the UE and the MME transition to an EMM-REGISTERED state.

Also, in order to manage signaling connection between the UE and the network, an EPS connection management CONNECTED (ECM-CONNECTED) state and an ECM-IDLE state may be defined. The ECM-CONNECTED state and the ECM-IDLE state may also be applied to the UE and the MME. The ECM connection may include an RRC connection established between the UE and a BS and an S1 signaling connection established between the BS and the MME. The RRC state indicates whether an RRC layer of the UE and an RRC layer of the BS are logically connected. That is, when the RRC layer of the UE and the RRC layer of the BS are connected, the UE may be in an RRC_CONNECTED state. When the RRC layer of the UE and the RRC layer of the BS are not connected, the UE in an RRC_IDLE state.

Here, the ECM and EMM states are independent of each other and when the UE is in EMM-REGISTERED state this does not imply that the user plane (radio and S1 bearers) is established In E-UTRAN RRC_CONNECTED state, network-controlled UE-assisted handovers are performed and various DRX cycles are supported. In E-UTRAN RRC_IDLE state, cell reselections are performed and DRX is supported.

The network may recognize the presence of the UE in the ECM-CONNECTED state by the cell and effectively control the UE. That is, when the UE is in the ECM-CONNECTED state, mobility of the UE is managed by a command from the network. In the ECM-CONNECTED state, the network knows about a cell to which the UE belongs. Thus, the network may transmit and/or receive data to or from the UE, control mobility such as handover of the UE, and perform cell measurement on a neighbor cell.

Meanwhile, the network cannot recognize the presence of the UE in the ECM-idle state and a core network (CN) manages the UE by the tracking area, a unit greater than cell. When the UE is in the ECM-idle state, the UE performs discontinuous reception (DRX) set by the NAS using an ID uniquely assigned in a tracking region. That is, the UE may monitor a paging signal at a particular paging opportunity in every UE-specific paging DRX cycle to receive broadcast of system information and paging information. Also, when the UE is in the ECM-idle state, the network does not have context information of the UE.

Thus, the UE in the ECM-idle state may perform a UE-based mobility-related procedure such as cell selection or cell reselection without having to receive a command from the network. When a location of the UE in the ECM-idle state is changed from that known by the network, the UE may inform the network about a location thereof through a tracking area update (TAU) procedure.

As described above, in order for the UE to receive a general mobile communication service such as voice or data, the UE needs to transition to an ECM-CONNECTED state. The UE is in the ECM-IDLE state like the case in which power of the UE is first turned on. When the UE is successfully registered in the corresponding network through an initial attach procedure, the UE and the MME transition to an ECM-CONNECTED state. Also, in a case in which the UE is registered in the network but traffic is deactivated so radio resource is not allocated, the UE is in an ECM-IDLE state, and when uplink or downlink new traffic is generated in the corresponding UE, the UE and the MME transition to an ECM-CONNECTED state through a service request procedure.

FIG. 3 illustrates physical channels and a view showing physical channels used for in the 3GPP LTE/LTE-A system to which the present invention can be applied.

When a UE is powered on or when the UE newly enters a cell, the UE performs an initial cell search operation such as synchronization with a BS in step S301. For the initial cell search operation, the UE may receive a Primary Synchronization Channel (P-SCH) and a Secondary Synchronization Channel (S-SCH) from the BS so as to perform synchronization with the BS, and acquire information such as a cell ID.

Thereafter, the UE may receive a physical broadcast channel (PBCH) from the BS and acquire broadcast information in the cell. Meanwhile, the UE may receive a Downlink Reference signal (DL RS) in the initial cell search step and confirm a downlink channel state.

The UE which completes the initial cell search may receive a Physical Downlink Control Channel (PDCCH) and a Physical Downlink Shared Channel (PDSCH) corresponding to the PDCCH, and acquire more detailed system information in step S302.

Thereafter, the UE may perform a random access procedure in steps S303 to S306, in order to complete the access to the BS. For the random access procedure, the UE may transmit a preamble via a Physical Random Access Channel (PRACH) (S303), and may receive a message in response to the preamble via the PDCCH and the PDSCH corresponding thereto (S304). In contention-based random access, a contention resolution procedure including the transmission of an additional PRACH (S305) and the reception of the PDCCH and the PDSCH corresponding thereto (S306) may be performed.

The UE which performs the above-described procedure may then receive the PDCCH/PDSCH (S307) and transmit a Physical Uplink Shared Channel (PUSCH)/Physical Uplink Control Channel (PUCCH) (S308), as a general uplink/downlink signal transmission procedure.

Control information transmitted from the UE to the BS is collectively referred to as uplink control information (UCI). The UCI includes hybrid automatic repeat and request acknowledgement/negative-acknowledgement (HARQ ACK/NACK), scheduling request (SR), channel quality information (CQI), precoding matrix indicator (PMI), rank indication (RI), etc. In the embodiments of the present invention, CQI and/or PMI are also referred to as channel quality control information.

In general, although a UCI is periodically transmitted via a PUCCH in the LTE system, this may be transmitted through a PUSCH if control information and traffic data are simultaneously transmitted. In addition, a UCI may be aperiodically transmitted via a PUSCH according to a network request/instruction.

FIG. 4 is a diagram showing the structure of a radio frame used in a 3GPP LTE system to which the present invention can be applied.

In a cellular OFDM radio packet communication system, uplink/downlink data packet transmission is performed in subframe units and one subframe is defined as a predetermined duration including a plurality of OFDM symbols. The 3GPP LTE standard supports a type-1 radio frame structure applicable to frequency division duplex (FDD) and a type-2 radio frame structure applicable to time division duplex (TDD). According to the FDD scheme, the UL transmission and the DL transmission are performed by occupying different frequency bandwidths. According to the TDD scheme, the UL transmission and the DL transmission are performed on respective times different from each other while occupying the same frequency bandwidth. The channel response in the TDD scheme is substantially reciprocal. This signifies that the DL channel response and the UL channel response are about the same in a given frequency domain. Accordingly, there is a merit that the DL channel response can be obtained from the UL channel response in wireless communication systems based on the TDD. In the TDD scheme, since entire frequency bandwidth is timely divided in the UL transmission and the DL transmission, the DL transmission by an eNB and the UL transmission by a UE may not be performed simultaneously. In the TDD system in which the UL transmission and the DL transmission are distinguished by a unit of subframe, the UL transmission and the DL transmission are performed in different subframes.

FIG. 4(a) shows the structure of the type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0.5 ms. One slot includes a plurality of OFDM symbols in a time domain and includes a plurality of resource blocks (RBs) in a frequency domain. In the 3GPP LTE system, since OFDMA is used in the downlink, an OFDM symbol indicates one symbol period. The OFDM symbol may be referred to as an SC-FDMA symbol or symbol period. A RB as a resource allocation unit may include a plurality of consecutive subcarriers in one slot.

The number of OFDM symbols included in one slot may be changed according to the configuration of cyclic prefix (CP). CP includes an extended CP and a normal CP. For example, if OFDM symbols are configured by the normal CP, the number of OFDM symbols included in one slot may be 7. If OFDM symbols are configured by the extended CP, since the length of one OFDM symbol is increased, the number of OFDM symbols included in one slot is less than the number of OFDM symbols in case of the normal CP. In case of the extended CP, for example, the number of OFDM symbols included in one slot may be 6. In the case where a channel state is unstable, such as the case where a UE moves at a high speed, the extended CP may be used in order to further reduce inter-symbol interference.

In case of using the normal CP, since one slot includes seven OFDM symbols, one subframe includes 14 OFDM symbols. At this time, a maximum of three first OFDM symbols of each subframe may be allocated to a physical downlink control channel (PDCCH) and the remaining OFDM symbols may be allocated to a physical downlink shared channel (PDSCH).

FIG. 4(b) shows the structure of the type-2 radio frame. The type-2 radio frame includes two half frames and each half frame includes five subframes, a downlink pilot time slot (DwPTS), a guard period (GP) and an uplink pilot time slot (UpPTS). From among these, one subframe includes two slots. The DwPTS is used for initial cell search, synchronization or channel estimation of a UE. The UpPTS is used for channel estimation of a BS and uplink transmission synchronization of a UE. The GP is used to eliminate interference generated in the uplink due to multi-path latency of a downlink signal between the uplink and the downlink.

The structure of the radio frame is only exemplary and the number of subframes included in the radio frame, the number of slots included in the subframe, or the number of symbols included in the slot may be variously changed.

FIG. 5 shows an example of a resource grid for one downlink slot in the wireless communication system to which the present invention can be applied.

Referring to the FIG. 5, the downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block includes 12×7 resource elements. The resource element on the resource grid may be identified by an index pair (k, l) in the slot. Here, k (k=0, NRB×12−1) denotes an index of subcarrier in the frequency domain, and l(l=0, . . . , 6) denotes an index of symbol in the time domain. The number NDL of resource blocks included in the downlink slot depends on a downlink transmission bandwidth determined in a cell.

FIG. 6 shows a structure of a downlink subframe in the wireless communication system to which the present invention can be applied.

Referring to the FIG. 6, a maximum of three OFDM symbols located in a front portion of a first slot in a subframe correspond to a control region to be assigned with control channels. The remaining OFDM symbols correspond to a data region to be assigned with physical downlink shared channels (PDSCHs).

Examples of downlink control channels used in the 3GPP LTE include a physical control format indicator channel (PCFICH), a physical downlink control channel (PDCCH), a physical hybrid-ARQ indicator channel (PHICH), etc. The PCFICH transmitted in a 1st OFDM symbol of a subframe carries information regarding the number of OFDM symbols (i.e., a size of a control region) used for transmission of control channels in the subframe. Control information transmitted over the PDCCH is referred to as downlink control information (DCI). The DCI transmits uplink resource assignment information, downlink resource assignment information, an uplink transmit power control (TPC) command for any UE groups, etc. The PHICH carries an acknowledgement (ACK)/not-acknowledgement (NACK) signal for an uplink hybrid automatic repeat request (HARQ). That is, the ACK/NACK signal for uplink data transmitted by a UE is transmitted over the PHICH.

A BS determines a PDCCH format according to DCI to be transmitted to a UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC, To indicate a random access response that is a response for transmission of a random access preamble of the UE, a random access-RNTI (RA-RNTI) may be masked to the CRC.

FIG. 7 shows a structure of an uplink subframe in the wireless communication system to which the present invention can be applied.

Referring to the FIG. 7, the uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. In case of being indicated from higher layer, UE can simultaneously transmit the PUCCH and the PUSCH.

The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Physical Downlink Control Channel (PDCCH)

The control information transmitted through the PDCCH is referred to as a downlink control indicator (DCI). In the PDCCH, a size and use of the control information are different according to a DCI format. In addition, a size of the control information may be changed according to a coding rate.

Table 1 represents the DCI according to the DCI format.

TABLE 1

| DCI format | Objectives |
|---|---|
| 0 | Scheduling of PUSCH |
| 1 | Scheduling of one PDSCH codeword |
| 1A | Compact scheduling of one PDSCH codeword |
| 1B | Closed-loop single-rank transmission |
| 1C | Paging, RACH response and dynamic BCCH |
| 1D | MU-MIMO |
| 2 | Scheduling of rank-adapted closed-loop spatial multiplexing mode |
| 2A | Scheduling of rank-adapted open-loop spatial multiplexing mode |
| 3 | TPC commands for PUCCH and PUSCH with 2 bit power adjustments |
| 3A | TPC commands for PUCCH and PUSCH with single bit power adjustments |
| 4 | the scheduling of PUSCH in one UL cell with multi-antenna port transmission mode |

Referring to Table 1, the DCI format includes format 0 for the PUSCH scheduling, format 1 for scheduling of one PDSCH codeword, format 1A for compact scheduling of one PDSCH codeword, format 1C for very compact scheduling of the DL-SCH, format 2 for PDSCH scheduling in a closed-loop spatial multiplexing mode, format 2A for PDSCH scheduling in an open-loop spatial multiplexing mode, formats 3 and 3A for transmitting a transmission power control (TPC) command for a UL channel, and format 4 for PUSCH scheduling within one UL cell in a multiple antenna port transmission mode.

The DCI format 1A may be used for PDSCH scheduling whichever transmission mode is configured to a UE.

Such DCI formats may be independently applied to each UE, and the PDCCHs of several UEs may be simultaneously multiplexed in one subframe. The PDCCH is comprised of an aggregation of one or a few continuous control channel elements (CCEs). The CCE is a logical allocation unit used for providing a coding rate according to a state of radio channel to the PDCCH. The CCE is referred to as a unit that corresponds to nine sets of resource element group (REG) which is comprised of four resource elements. An eNB may use {1, 2, 4, 8} CCEs for constructing one PDCCH signal, and this {1, 2, 4, 8} is called a CCE aggregation level. The number of CCE used for transmitting a specific PDCCH is determined by the eNB according to the channel state. The PDCCH configured according to each UE is mapped with being interleaved to a control channel region of each subframe by a CCE-to-RE mapping rule. A location of the PDCCH may be changed according to the number of OFDM symbols for the control channel, the number of PHICH group, a transmission antenna, a frequency shift, etc.

As described above, a channel coding is independently performed for the PDCCH of each multiplexed UE, and the cyclic redundancy check (CRC) is applied. By masking each UE ID to CRC, the UE may receive its PDCCH. However, in the control region allocated in a subframe, the eNB does not provide information on where the PDCCH that corresponds to the UE is. Since the UE is unable to know on which position its PDCCH is transmitted with which CCE aggregation level and DCI format in order to receive the control channel transmitted from the eNB, the UE finds its own PDCCH by monitoring a set of PDCCH candidates in a subframe. This is called a blind decoding (BD). The blind decoding may also be called a blind detection or a blind search. The blind decoding signifies a method of verifying whether the corresponding PDCCH is its control channel by checking CRC errors, after the UE de-masks its UE ID in CRC part.

Buffer Status Reporting (BSR)

FIG. 8 illustrates the MAC PDU used in the MAC entity in the wireless communication system to which the present invention can be applied.

Referring to FIG. 8, the MAC PDU includes a MAC header, at least one MAC service data unit (SDU) and at least one control element, additionally may include padding. In some cases, at least one of the MAC SDUs and the MAC control elements may not be included in the MAC PDU.

As an example of FIG. 8, it is common that the MAC control elements are located ahead of the MAC SDUs. And the size of MAC control elements may be fixed or changeable. In case that the size of MAC control elements is changeable, it may be determined through an extended bit whether the size of MAC control elements is extended. The size of MAC SDU may be also variable.

The MAC header may include at least one sub-header. In this time, at least one sub-header that is included in the MAC header is respectively corresponding to the MAC SDUs, the MAC control elements and the padding, and the order of the sub-header is same as the arrangement order of the corresponding elements. For example, as an example of FIG. 8, if there are included MAC control element 1, MAC control element 2, a plurality of MAC SDUs and padding in the MAC PDU, in the MAC header, the following may be arranged in order as a sub-header corresponding to the MAC control element 1, a sub-header corresponding to the MAC control element 2, a plurality of sub-headers corresponding to a plurality of MAC SDUs respectively and a sub-header corresponding to the padding.

Sub-headers included in the MAC header, as an example of FIG. 8, six header fields may be included. Particularly, the sub-header may include six header fields of R/R/E/LCID/F/L.

For the sub-header corresponding to the very last one among the sub-header corresponding to the MAC control element of fixed size and data fields included in the MAC PDU, as an example illustrated in FIG. 8, the sub-header that is included four header fields may be used. In case that the sub-header includes four fields like this, the four fields may be R/R/E/LCID.

FIG. 9 and FIG. 10 illustrate the sub-header of the MAC PDU in the wireless communication system to which the present invention can be applied.

Each field is described as below with reference to FIG. 9 and FIG. 10.

1) R: Reserved bit, which is not used.

2) E: Extended field, which represents whether the elements corresponding to the sub-header are extended. For example, in case that E field is '0', the element corresponding to the sub-header is terminated without any repeat, and in case that E field is '1', the element corresponding to the sub-header is repeated once more and may be extended by twice in the length.

LCID: Logical channel identification field identifies a logical channel corresponding to the relevant MAC SDU or identifies a type of the relevant MAC control element and padding. If the MAC SDU is associated with the sub-header, it may show which logical channel the MAC SDU is corresponding to, and if the MAC control element is associated with the sub-header, it may show what the MAC control element is.

Table 2 represents the value of LCID for the DL-SCH

TABLE 2

| Index | LCID values |
| --- | --- |
| 00000 | CCCH |
| 00001-01010 | Identity of the logical channel |
| 01011-11001 | Reserved |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

Table 3 represents the value of LCID for the UL-SCH

TABLE 3

| Index | LCID values |
| --- | --- |
| 00000 | CCCH |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

In LTE/LTE-A system, the UE may report the buffer state of its own to the network by configuring one of the index value among truncated BSR, short BSR, and long BSR in the LCID field.

The relationship of mapping between the index and the LCID value illustrated in Table 2 and Table 3 is exemplified for the convenience of the descriptions, but the present invention is not limited thereto.

4) F: Format field, which represents the size of L field.

5) L: Length field, which represents the size of MAC SDU and MAC control element corresponding to the sub-header. If the size of MAC SDU or MAC control element corresponding to the sub-header is equal to or less than 127 bits, the 7-bit L field is used (FIG. 9 (a)), otherwise, the 15-bit L field may be used (FIG. 9 (b)). In case that the size of MAC control element is changeable, the size of MAC control element may be defined by the L field. In case that the size of MAC control element is fixed, the size of MAC control element may be determined without the size of MAC control element being defined by the L field, accordingly the F and L field may be omitted as shown in FIG. 10.

FIG. 11 illustrates formats of the MAC control elements in order to report the buffer state in the wireless communication system to which the present invention can be applied.

In case of the truncated BSR and short BSR being defined in the LCID field of sub-header, the MAC control element corresponding to the sub-header, as shown in FIG. 11 (a), may be configured to include one logical channel group identification (LCG ID) field and one buffer size field indicating the buffer state of the LCG. The LCG ID field is for identifying the logical channel group that is required to report the buffer state, which may have the size of 2 bits.

The buffer size field is used for identifying the total amount of available data from the all logical channels that are included in the LCG. The available data includes all the data that are going to be transmitted from the RLC layer and the PDCP layer, and the amount of data is represented in byte. In this time, the size of RLC header and MAC header may be excluded when calculating the amount of data. The buffer size field may be 6 bits.

In case of the extended BSR being defined in the LCID field of sub-header, the MAC control element corresponding to the sub-header, as shown in FIG. 11 (b), may include four buffer size fields indicating the buffer state of four groups having 0 to 3 LCG IDs. Each of the buffer size fields may be used for identifying the total amount of available data from different logical channel groups.

Uplink Resource Allocation Procedure

In 3GPP LTE/LTE-A system, in order to maximize resource utilization, the data transmission and reception method based on scheduling of an eNB is used. This signifies that if there are data to transmit by a UE, the UL resource allocation is preferentially requested to the eNB, and the data may be transmitted using only UL resources allocated by the eNB.

FIG. 12 illustrates a UL resource allocation procedure of a UE in the wireless communication system to which the present application can be applied.

For effective utilization of the UL radio resources, an eNB should know which sorts and what amount of data to be transmitted to the UL for each UE. Accordingly, the UE itself may forward the information of UL data to transmit, and the eNB may allocate the UL resources to the corresponding UE based on this. In this case, the information of the UL data that the UE forwards to the eNB is the quality of UL data stored in its buffer, and this is referred to as a buffer status report (BSR). The BSR is transmitted using a MAC control element in case that the resources on the PUSCH in current TTI are allocated to the UE and the reporting event is triggered.

FIG. 12(a) exemplifies a UL resource allocation procedure for actual data in case that the UL radio resources for the buffer status reporting (BSR) are not allocated to a UE. That is, for a UE that switches a state of active mode in the DRX mode, since there is no data resource allocated beforehand, the resource for UL data should be requested starting from the SR transmission through the PUCCH, in this case, the UL resource allocation procedure of 5 steps is used.

Referring to FIG. 12(a), the case that the PUSCH resource for transmitting the BSR is not allocated to a UE is illustrated, and the UE transmits the scheduling request (SR) to an eNB first in order to be allocated with the PUSCH resources (step, S1201).

The scheduling request (SR) is used to request in order for the UE to be allocated with the PUSCH resource for UL transmission in case that the reporting event is occurred but the radio resource is not scheduled on the PUSCH in current TTI. That is, the UE transmits the SR on the PUCCH when the regular BSR is triggered but does not have the UL radio resource for transmitting the BSR to the eNB. The UE transmits the SR through the PUCCH or starts the random access procedure according to whether the PUCCH resources for the SR are configured. In particular, the PUCCH resources in which the SR can be transmitted may be determined as a combination of the PRB through which the SR is transmitted, the cyclic shift (CS) applied to a basic sequence (e.g., ZC sequence) for spread in frequency domain of the SR and an orthogonal code (OC) for spread in time domain of the SR. Additionally, the SR periodicity and the SR subframe offset information may be included. The PUCCH resources through which the SR can be transmitted may be configured by a higher layer (e.g., the RRC layer) in UE-specific manner.

When a UE receives the UL grant for the PUSCH resources for BSR transmission from an eNB (step, S1203), the UE transmits the triggered BSR through the PUSCH resources which are allocated by the UL grant (step, S1205).

The eNB verifies the quality of data that the UE actually transmit to the UL through the BSR, and transmits the UL grant for the PUSCH resources for actual data transmission to the UE (step, S1207). The UE that receives the UL grant for actual data transmission transmits the actual UL data to the eNB through the PUSCH resources (step, S1209).

FIG. 12(b) exemplifies the UL resource allocation procedure for actual data in case that the UL radio resources for the BSR are allocated to a UE.

Referring to FIG. 12(b), the case that the PUSCH resources for BRS transmission are already allocated to a UE is illustrated. In the case, the UE transmits the BSR through the allocated PUSCH resources, and transmits a scheduling request to an eNB (step, S1211). Subsequently, the eNB verifies the quality of data to be transmitted to the UL by the UE through the BSR, and transmits the UL grant for the PUSCH resources for actual data transmission to the UE (step, S1213). The UE that receives the UL grant for actual data transmission transmits the actual UL data to the eNB through the allocated PUSCH resources (step, S1215).

FIG. 13 is a diagram for describing a latency in C-plane required in 3GPP LTE-A to which the present invention can be applied.

Referring to FIG. 13, 3GPP LTE-A requests a transition time from an idle mode (a state that IP address is allocated) to a connected mode to be less than 50 ms. In this time, the transition time includes a configuration time (except latency for transmitting S1) in a user plane (U-plane). In addition, a transition time from a dormant state to an active state in the connection mode is requested to be less than 10 ms.

The transition from the dormant state to the active state may occur in 4 scenarios as follows.

Uplink initiated transition, synchronized
Uplink initiated transition, unsynchronized
Downlink initiated transition, synchronized
Downlink initiated transition, unsynchronized
Random Access Channel (RACH) Procedure FIGS. 14a and 14b illustrate one example of a random access procedure in the LTE system.

The random access procedure is carried out during initial connection in the RRC_IDLE state, initial connection after radio link failure, handover which requires the random access procedure, and upon occurrence of uplink or downlink data requiring the random access procedure while in the RRC_CONNECTED state. Part of the RRC message such as the RRC connection request message, cell update message, and UTRAN registration area (URA) update message is also transmitted through the random access procedure. Logical channels such as a common control channel (CCCH), dedicated control channel (DCCH), and dedicated traffic channel (DTCH) can be mapped to a physical channel, random access channel (RACH). The RACH is mapped to a physical channel, physical random access channel (PRACH).

If the MAC layer of the UE commands the UE's physical layer to perform PRACH transmission, the UE's physical layer first selects one access slot and one signature and transmits a PRACH preamble through uplink transmission. The random access procedure is divided into a contention-based random access procedure and a non-contention based random access procedure.

FIG. 14a illustrates one example of a contention-based random access procedure, and FIG. 14b illustrates one example of a non-contention based random access procedure.

First, the contention-based random access procedure will be described with reference to FIG. 14a.

The UE receives information about random access from the eNB through system information and stores the received information. Afterwards, in case random access is needed, the UE transmits a random access preamble (which is also called a message 1) to the eNB S1401.

If the eNB receives a random access preamble from the UE, the eNB transmits a random access response message (which is also called a message 2) to the UE S1402. More specifically, downlink scheduling information about the random access response message, being CRC-masked with a random access-ratio network temporary identifier (RA-RNTI), can be transmitted on an L1 or L2 control channel (PDCCH). The UE, which has received a downlink scheduling signal masked with an RA-RNTI, can receive the random access response message from a physical downlink shared channel (PDSCH) and decode the received message. Afterwards, the UE checks the random access response message as to whether random access response information for the UE exists.

The UE can determine existence of random access response information by checking existence of a random access preamble ID (RAID) with respect to the preamble that the UE has transmitted.

The random access response information includes timing alignment (TA) indicating timing offset information for synchronization, radio resource allocation information used for uplink transmission, and a temporary C-RNTI for identifying UEs.

If receiving random access response information, the UE carries out uplink transmission (which is also called a message 3) to an uplink shared channel (UL-SCH) according to radio resource allocation information included in the response information S1403. At this time, uplink transmission may be described as scheduled transmission.

After receiving the uplink transmission from the UE, the eNB transmits a message for contention resolution (which is also called a message 4) to the UE through a downlink shared channel (DL-SCH) S1404.

Next, a non-contention based random access procedure will be described with reference to FIG. 14b.

Before the UE transmits a random access preamble, the eNB allocates a non-contention random access preamble to the UE S1411.

The non-contention random access preamble can be allocated through a handover command or dedicated signaling such as signaling through the PDCCH. In case non-contention random access preamble is allocated to the UE, the UE transmits the allocated non-contention random access preamble to the eNB S1412.

Afterwards, similarly to the S1402 step of the contention-based random access procedure, the UE can transmit a random access response (which is also called a message 2) to the UE S1413.

Although the HARQ is not applied for a random access response during the random access procedure described above, the HARQ can be applied for uplink transmission with respect to a random access response or a message for contention resolution. Therefore, the UE doesn't have to transmit ACK or NACK signal for the case of the random access response.

Physical Uplink Control Channel (PUCCH)

Uplink control information (UCI) transmitted through a PUCCH may include a scheduling request (SR), HARQ ACK/NACK information and downlink channel measurement information.

The HARQ ACK/NACK information may be generated depending on whether a downlink data packet on a PDSCH has been successfully decoded or not. In an existing wireless communication system, 1 bit is transmitted as ACK/NACK information with respect to the transmission of downlink single codeword, and 2 bits are transmitted as ACK/NACK information with respect to the transmission of downlink 2 codewords.

The channel measurement information refers to feedback information related to a multiple input multiple output (MIMO) scheme, and may include a channel quality indicator (CQI), a precoding matrix index (PMI) and a rank indicator (RI). Pieces of these channel measurement information may be collectively expressed as a CQI.

For the transmission of a CQI, 20 bits may be used per subframe.

A PUCCH may be modulated using binary phase shift keying (BPSK) scheme and a quadrature phase shift keying (QPSK) scheme. Control information of a plurality of UEs may be transmitted through a PUCCH. If code division multiplexing (CDM) is performed to distinguish the signals of UEs, a constant amplitude zero autocorrelation (CAZAC) sequence of a length 12 is chiefly used. The CAZAC sequence has a characteristic in that it maintains constant amplitude in a time domain and a frequency domain, and thus has a property suitable for increasing coverage by lowering the peak-to-average power ratio (PAPR) or cubic metric (CM) of a UE. Furthermore, ACK/NACK information for downlink data transmission transmitted through a PUCCH is covered using orthogonal sequence or orthogonal cover (OC).

Furthermore, control information transmitted on a PUCCH may be distinguished using a cyclically shifted sequence having a different cyclic shift (CS) value. The cyclically shifted sequence may be generated by cyclically shifting a base sequence by a specific CS amount. The specific CS amount is indicated by a CS index. The number of available cyclic shifts may be different depending on the latency spread of a channel. A variety of types of sequences may be used as the base sequence, and the aforementioned CAZAC sequence is an example thereof.

Furthermore, the amount of control information which may be transmitted by a UE in one subframe may be determined depending on the number of SC-FDMA symbols which may be used to send control information (i.e., SC-FDMA symbols other than an SC-FDMA symbol used in the transmission of a reference signal (RS) for the coherent detection of a PUCCH.

In the 3GPP LTE system, a PUCCH is defined as a total of different formats depending on transmitted control information, a modulation scheme and the amount of control information. The attributes of uplink control information (UCI) transmitted may be summarized as in Table 4 below depending on each PUCCH format.

TABLE 4

| PUCCH Format | Uplink Control Information(UCI) |
|---|---|
| Format 1 | Scheduling Request (SR) (unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |

The PUCCH format 1 is used for the sole transmission of an SR. In the case of the SR sole transmission, a non-modulated waveform is applied, which is described in detail later.

The PUCCH format 1a or 1 b is used for the transmission of HARQ ACK/NACK. If HARQ ACK/NACK is solely transmitted in a specific subframe, the PUCCH format 1a or 1b may be used. Alternatively, HARQ ACK/NACK and an SR may be transmitted in the same subframe using the PUCCH format 1a or 1b.

The PUCCH format 2 is used for the transmission of a CQI, and the PUCCH format 2a or 2b is used for the transmission of a CQI and HARQ ACK/NACK.

In the case of an extended CP, the PUCCH format 2 may be used for the transmission of a CQI and HARQ ACK/NACK.

FIG. 15 shows an example of a form in which the PUCCH formats are mapped to PUCCH regions in a wireless communication system to which an embodiment of the present invention may be applied.

In FIG. 15, $N_{RB}^{UL}$ indicates the number of resource blocks in uplink, and $0, 1, \ldots, N_{RB}^{UL}-1$ mean the numbers of physical resource blocks. Basically, a PUCCH is mapped to the edges of an uplink frequency block on both sides thereof. As shown in FIG. 15, the PUCCH formats 2/2a/2b are mapped to a PUCCH region indicated by m=0, 1. It may be represented that the PUCCH formats 2/2a/2b are mapped to resource blocks located at a band edge. Furthermore, both the PUCCH formats 2/2a/2b and the PUCCH formats 1/1a/1b may be mixed and mapped to a PUCCH region indicated by m=2. The PUCCH formats 1/1a/1b may be mapped to PUCCH regions indicated by m=3, 4, 5. The number of PUCCH RBs $N_{RB}^{(2)}$ available for the PUCCH formats 2/2a/2b may be indicated for UEs within a cell through broadcasting signaling.

The PUCCH formats 2/2a/2b are described. The PUCCH formats 2/2a/2b are control channels for transmitting channel measurement feedback (i.e., a CQI, a PMI and an RI).

The report cycle of channel measurement feedback (hereinafter collectively referred to as "CQI information") and a frequency unit (or frequency resolution), that is, the subject of measurement, may be controlled by an eNB. In the time domain, a periodic CQI report and an aperiodic CQI report may be supported. The PUCCH format 2 may be used for only a periodic report, and a PUSCH may be used for an aperiodic report. In the case of the aperiodic report, an eNB may instruct a UE to carry an individual CQI report on resources scheduled for the transmission of UL data and to send the CQI.

FIG. 16 shows the structure of a CQI channel in the case of a common CP in a wireless communication system to which an embodiment of the present invention may be applied.

The SC-FDMA symbols 1 and 5 (the second and the sixth symbols) of the SC-FDMA symbols 0 to 6 of one slot may be used for the transmission of a demodulation reference signal (DMRS), and CQI information may be transmitted in the remaining SC-FDMA symbols. In the case of, an extended CP, one SC-FDMA symbol (e.g., the SC-FDMA symbol 3) is used for the transmission of a DMRS.

In the PUCCH formats 2/2a/2b, modulation according to the CAZAC sequence is supported, and the CAZAC sequence of a length 12 is multiplied by a QPSK-modulated symbol. A cyclic shift (CS) of a sequence is changed between a symbol and a slot. Orthogonal covering is used for a DMRS.

A reference signal (DMRS) is carried on two SC-FDMA symbols that belong to seven SC-FDMA symbols included in one slot and that are spaced apart by three SC-FDMA symbols. CQI information is carried on the remaining five SC-FDMA symbols. Two RSs are used within one slot in order to support a high-speed UE. Furthermore, UEs are distinguished from each other using a cyclic shift (CS) sequence. CQI information symbols are modulated and transferred over all of SC-FDMA symbols. The SC-FDMA symbol has one sequence. That is, a UE modulates a CQI according to each sequence and transmits the CQI.

The number of symbols which may be transmitted in one TTI is 10. The modulation of CQI information has been determined up to QPSK. If QPSK mapping is used for an SC-FDMA symbol, a CQI value of 10 bits may be carried on one slot because a CQI value of 2 bits is carried on the SC-FDMA symbol. Accordingly, a CQI value of a maximum of 20 bits may be carried on one subframe. A frequency domain spread symbol is used to spread CQI information in the frequency domain.

A CAZAC sequence (e.g., ZC sequence) of a length 12 may be used as a frequency domain spread symbol. Control channels may be distinguished from each other by applying CAZAC sequences having different cyclic shift values. IFFT is performed on CQI information on which frequency domain spreading has been performed.

12 different UEs may be orthogonally multiplexed on the same PUCCH RB by 12 cyclic shifts having the same interval. In the case of a common CP, a DMRS sequence on the SC-FDMA symbols 1 and 5 (on the SC-FDMA symbol in the case of an extended CP) is similar to a CQI signal sequence on the frequency domain, but modulation, such as CQI information, is not applied to the DMRS sequence.

A UE may be semi-statically configured by higher layer signaling so that it periodically reports different CQI, PMI and RI types on PUCCH resources indicated by PUCCH resources indices $n_{PUCCH}^{(1,\tilde{p})}$, $n_{PUCCH}^{(2,\tilde{p})}$ and $n_{PUCCH}^{(3,\tilde{p})}$. In this case, the PUCCH resources index $n_{PUCCH}^{(2,\tilde{p})}$ is information indicative of a PUCCH region used for the transmission of the PUCCH formats 2/2a/2b and the value of a cyclic shift (CS) to be used.

PUCCH Channel Structure

The PUCCH formats 1a and 1b are described.

In the PUCCH formats 1a/1b, a symbol modulated using the BPSK or QPSK modulation scheme is multiplied by a CAZAC sequence of a length 12. For example, the results of the multiplication of a modulation symbol d(0) by a CAZAC sequence r(n) (n=0, 1, 2, . . . , N−1) of a length N are y(0), y(1), y(2), . . . , y(N−1). y(0), . . . , y(N−1) symbols may be called a block of symbols. After a modulation symbol is multiplied by a CAZAC sequence, block-wise spreading using an orthogonal sequence is applied.

A Hadamard sequence of a length 4 is used for common ACK/NACK information, and a discrete Fourier transform (DFT) sequence of a length 3 is used for shortened ACK/NACK information and a reference signal.

A Hadamard sequence of a length 2 is used for a reference signal in the case of an extended CP.

FIG. 17 shows the structure of an ACK/NACK channel in the case of a common CP in a wireless communication system to which an embodiment of the present invention may be applied.

FIG. 17 illustrates the structure of a PUCCH channel for the transmission of HARQ ACK/NACK without a CQI.

A reference signal (RS) is carried on three contiguous SC-FDMA symbols that belong to seven SC-FDMA symbols included in one slot and that are located in the middle part, and an ACK/NACK signal is carried on the remaining four SC-FDMA symbols.

In the case of an extended CP, an RS may be carried on two contiguous symbols in the middle. The number and location of symbols used for an RS may be different depending on a control channel. The number and location of symbols used for an ACK/NACK signal associated with the RS may also be changed depending on the RS.

Pieces of acknowledgement information (an unscrambled state) of 1 bit and 2 bits may be expressed as one HARQ ACK/NACK modulation symbol using the BPSK and QPSK modulation schemes, respectively. Positive acknowledgement (ACK) may be encoded into "1", and negative acknowledgement (NACK) may be encoded into "0."

2-dimensional spreading is applied in order to improve a multiplexing capacity when a control signal is transmitted within an allocated band. That is, in order to increase the number of UEs or the number of control channels that may be multiplexed, frequency domain spreads and time domain spreads are applied at the same time.

In order to spread an ACK/NACK signal in the frequency domain, a frequency domain sequence is used as a base sequence. A Zadoff-Chu (ZC) sequence, that is, one of CAZAC sequences, may be used as a frequency domain sequence. For example, the multiplexing of different UEs or different control channels may be applied by applying a different cyclic shift (CS) to a ZC sequence, that is, a base sequence. The number of CS resources supported in an SC-FDMA symbol for PUCCH RBs for the transmission of HARQ ACK/NACK is set by a cell-specific higher layer signaling parameter $\Delta_{shift}^{PUCCH}$.

An ACK/NACK signal on which frequency domain spreading has been performed is spread in the time domain using orthogonal spreading code. A Walsh-Hadamard sequence or DFT sequence may be used as the orthogonal spreading code. For example, an ACK/NACK signal may be spread using orthogonal sequences w0, w1, w2 and w3 of a length 4 with respect to four symbols. Furthermore, an RS is also spread through an orthogonal sequence of a length 3 or a length 2. This is called orthogonal covering (OC).

A plurality of UEs may be multiplexed according to a code division multiplexing (CDM) method using the aforementioned CS resources in the frequency domain and the aforementioned OC resources in the time domain. That is, the ACK/NACK information and RSs of a large number of UEs on the same PUCCH RB may be multiplexed.

With respect to such time domain spreading CDM, the number of spreading codes supported with respect to ACK/NACK information is limited by the number of RS symbols. That is, since the number of RS transmission SC-FDMA symbols is smaller than that of ACK/NACK information transmission SC-FDMA symbols, the multiplexing capacity of an RS is smaller than that of ACK/NACK information.

For example, in the case of a common CP, ACK/NACK information may be transmitted in four symbols. Three orthogonal spreading codes not four orthogonal spreading codes are used for ACK/NACK information. The reason for this is that since the number of RS transmission symbols is limited to three, only the three orthogonal spreading codes may be used for an RS.

In the case where three symbols are used to send an RS and four symbols are used to send ACK/NACK information in one slot of a subframe of a common CP, for example, if six CSs can be used in the frequency domain and three orthogonal cover (OC) resources can be used in the time domain, HARQ acknowledgement from a total of 18 different UEs may be multiplexed within one PUCCH RB. In the case where two symbols are used to send an RS and four symbols are used to send ACK/NACK information in one slot of a subframe of an extended CP, for example, if six CSs can be used in the frequency domain and two orthogonal cover (OC) resources can be used in the time domain, HARQ acknowledgement from a total of 12 different UEs may be multiplexed within one PUCCH RB.

The PUCCH format 1 is described below. A scheduling request (SR) is transmitted in such a manner that a UE requests scheduling or does not scheduling. An SR channel reuses the ACK/NACK channel structure in the PUCCH formats 1a/1b and is configured according to an on-off keying (OOK) method based on the ACK/NACK channel design. A reference signal is not transmitted in the SR channel. Accordingly, a sequence of a length 7 is used in the case of a common CP, and a sequence of a length 6 is used in the case of an extended CR. Different cyclic shifts or orthogonal covers may be allocated to an SR and ACK/NACK. That is, for positive SR transmission, a UE transmits HARQ ACK/NACK through resources allocated for the SR. For negative SR transmission, a UE transmits HARQ ACK/NACK through resources allocated for ACK/NACK.

An enhanced-PUCCH (e-PUCCH) format is described below. The e-PUCCH may correspond to the PUCCH format 3 of the LTE-A system. A block spreading scheme may be applied to ACK/NACK transmission using the PUCCH format 3.

The block spreading scheme is a method of modulating the transmission of a control signal using the SC-FDMA method unlike the existing PUCCH format 1 series or 2 series. As shown in FIG. 8, a symbol sequence may be spread on the time domain using orthogonal cover code (OCC) and transmitted. The control signals of a plurality of UEs may be multiplexed on the same RB using the OCC. In the case of the aforementioned PUCCH format 2, one symbol sequence is transmitted in the time domain and the control signals of a plurality of UEs are multiplexed using the cyclic shift (CS) of a CAZAC sequence. In contrast, in the case of a block spreading-based PUCCH format (e.g., the PUCCH format 3), one symbol sequence is transmitted in the frequency domain and the control signals of a plurality of UEs are multiplexed using time domain spreading using the OCC.

FIG. 18 shows an example in which five SC-FDMA symbols are generated and transmitted for one slot in a wireless communication system to which an embodiment of the present invention may be applied.

FIG. 18 shows an example in which five SC-FDMA symbols (i.e., a data part) are generated using the OCC of a length=5 (or SF=5) in one symbol sequence for one slot. In this case, two RS symbols may be used for one slot.

In the example of FIG. 18, an RS symbol may be generated from a CAZAC sequence to which a specific cyclic shift value has been applied, and may be transmitted over a plurality of RS symbols in such a manner that a specific OCC has been applied (or multiplied). Furthermore, in the example of FIG. 18, assuming that 12 modulation symbols are used for each OFDM symbol (or SC-FDMA symbol) and each modulation symbol is generated by QPSK, a maximum number of bits which may be transmitted in one slot is 12×2=24 bits. Accordingly, the number of bits which may be transmitted in two slots is a total of 48 bits. If the PUCCH channel structure of the block spreading method is used as described above, control information having an extended size can be transmitted compared to the existing PUCCH format 1 series and 2 series.

Physical HARQ Indication Channel (PHICH)

A PHICH is described below.

In the LTE system, since SU-MIMO is not supported in uplink, one PHICH transmits only the PUSCH of one UE, that is, 1-bit ACK/NACK for a single stream.

The 1-bit ACK/NACK is coded into three bits using a repetition code whose code rate is 1/3. Three modulation symbols are generated by modulating the coded ACK/NACK according to a binary phase key-shifting (BPSK) method. The modulation symbol is spread using a spreading factor (SF)=4 in a normal CP structure and using SF=2 in an extended CP structure.

When the modulation symbols are spread, an orthogonal sequence is used. The number of orthogonal sequences used becomes SF*2 in order to apply I/Q multiplexing.

PHICHs spread using the SF*2 orthogonal sequence may be defined as one PHICH group. Layer mapping is performed on the spread symbols. The layer-mapped symbols are subjected to resource mapping and transmitted.

A PHICH transmits HARQ ACK/NACK according to PUSCH transmission. A plurality of PHICHs mapped to the resource elements of the same set forms a PHICH group. The PHICHs within the PHICH group are distinguished by different orthogonal sequences. In the FDD system, $n_{PHICH}^{group}$ that is the number of PHICH groups is constant in all of subframes, and may be determined by Equation 1.

$$N_{PHICH}^{group} = \begin{cases} \lceil N_g(N_{RB}^{DL}/8) \rceil, & \text{for normal cyclic prefix} \\ 2 \times \lceil N_g(N_{RB}^{DL}/8) \rceil, & \text{for extended cyclic prefix} \end{cases} \quad [\text{Equation 1}]$$

In Equation 1, Ng is transmitted in a higher layer through a physical broadcast channel (PBCH), and Ng∈{1/6,1/2,1,2}. The PBCH carries system information that is essential for a UE to communicate with an eNB. System information transmitted through the PBCH is called a master information block (MIB).

In contrast, system information transmitted through a physical downlink control channel (PDCCH) is called a system information block (SIB). $N_{RB}^{DL}$ is a downlink bandwidth configuration expressed by a multiplication of $N_{SC}^{RB}$, that is, the size of a resource block in the frequency domain. A PHICH group index $n_{PHICH}^{group}$ is any one integer of 0 to $n_{PHICH}^{group}-1$.

Resources used for a PHICH may be determined based on the smallest PRB index when the resources of a PUSCH are allocated and the cyclic shift value of a demodulation reference signal (DMRS) transmitted in an uplink (UL) grant.

Resources to which a PHICH is mapped (hereinafter referred to as "PHICH resources") may be expressed as $(n_{PHICH}^{group}, n_{PHICH}^{seq})$, that is, an index pair. $n_{PHICH}^{group}$ indicates a PHICH group index, and $n_{PHICH}^{group}$ indicates an orthogonal sequence index within the PHICH group. The $(n_{PHICH}^{group}, n_{PHICH}^{seq})$ may be determined by Equation 2 below.

$$n_{PHICH}^{group} = (I_{PRB_{RA}} + n_{DMRS}) \bmod n_{PHICH}^{group} + I_{PHICH} n_{PHICH}^{group},$$

$$n_{PHICH}^{seq} = (\lfloor I_{PRB\_RA}/n_{PHICH}^{group} \rfloor + n_{DMRS}) \bmod 2N_{SF}^{PHICH} \quad [\text{Equation 2}]$$

In Equation 2, the nDMRS is mapped from a cyclic shift for a demodulation reference signal (DMRS) field in the most recent PDCCH having an uplink DCI format for a transport block, which is related to the transmission of a corresponding PUSCH.

In contrast, if a PDCCH having an uplink DCI format for the same transport block is not present, an initial PUSCH for the same transport block is scheduled semi-persistently or when the initial PUSCH is scheduled by a random access response approval signal, the nDMRS is set to 0.

$N_{SF}^{PHICH}$ indicates a spreading factor size used for PHICH modulation.

$I_{PRB\_RA}$ is the same as $I_{PRB\_RA}^{lowest\_index}$ if it is the first transport block of a PUSCH related to a PDCCH or if the number of transport blocks manually recognized when a related PDCCH is not present is not the same as the number of transport blocks indicated in the most recent PDCCH related to the corresponding PUSCH.

In contrast, if it is the second transport block of a PUSCH related to the PDCCH, it is the same as $I_{PRB\_RA}^{lowest\_index}+1$. In this case, $I_{PRB\_RA}^{lowest\_index}$ corresponds to the lowest PRB index of the first slot of the transmission of the corresponding PUSCH.

$n_{PHICH}^{group}$ indicates the number of PHICH groups configured by a higher layer.

$I_{PHICH}$ has "1" if a PUSCH is transmitted in a subframe index 4 or 9 and "0" if not in the uplink-downlink configuration 0 of a TDD system.

Table 5 shows a mapping relation between a cyclic shift for a DMRS field used to determine PHICH resources in a PDCCH having an uplink DCI format and an nDMRS.

TABLE 5

| Cyclic Shift for DMRS Field in PDCCH with uplink DCI format | $n_{DMRS}$ |
| --- | --- |
| 000 | 0 |
| 001 | 1 |
| 010 | 2 |
| 011 | 3 |
| 100 | 4 |
| 101 | 5 |
| 110 | 6 |
| 111 | 7 |

The LTE/LTE-A system employs a frame structure having a TTI (Transmission Time Interval) of 1 ms, where requested delay time of data for video applications is generally about 10 ms.

However, due to the emergence of new applications such as real-time control and tactile Internet, the future 5G (Generation) technology demands data transmission of much lower latency, and the requested delay time for 5G data is expected to be reduced down to about 1 ms.

However, a conventional frame structure having a TTI of 1 ms does not meet the 1 ms of requested delay time of data.

FIG. 19 illustrates latency in wireless transmission and reception in the 3GPP LTE/LTE-A system.

FIG. 19 illustrates reference timing of wireless transmission and reception latency in terms of downlink transmission and reception in the 3GPP LTE system having a subframe of 1 ms.

Referring to FIG. 19, a propagation delay (PD) is generated from the time the eNB starts transmission of a downlink subframe until the time the UE starts to receive a downlink subframe. And as the UE starts buffering of the downlink subframe before decoding the downlink subframe, a buffering delay occurs. The propagation delay due to transmission of downlink subframes and the delay due to buffering of the UE occupy a total of about 0.5 ms. And the UE decodes the PDCCH in the downlink subframe and decodes the PDSCH on the basis of the PDCCH decoding information. The processing delay due to the PDCCH decoding (about 0.5 ms) and PDSCH decoding (less than about 2 ms).

As described above, the one-way OTA (Over-The-Air) latency from an eNB to a UE occupies about less than 3 ms.

And the delay for A/N (ACK/NACK) preparation (for example, ACK/NACK encoding) and the PD generated at the time of A/N transmission occupy a total of about less than 1 ms in the UE.

As described above, in the case of one-way data transmission, the total roundtrip OTA latency from a transmitter-side (for example, eNB) to a receiver-side (for example, UE) and back to the transmitter-side until the ACK/NACK is received generally occupies about 4 ms.

The 5G wireless communication system aims to provide data latency about ten times reduced than that of existing wireless communication systems. To achieve the goal set for the 5G system, it is expected that a wireless communication system of a new frame structure having a shorter TTI (for example, 0.2 ms) is proposed.

Also, the 5G system is expected to support various kinds of applications having requirements such as high capacity, low energy consumption, low cost, and high user data rate, not to mention the low latency. Therefore, to support various kinds of applications ranging from the one requiring ultra-low latency to the application requiring a high data rate simultaneously, the 5G system is expected to evolve to a system exhibiting a different structure from existing systems.

In this regard, to minimize data reception latency in the UE, a frame structure different from the existing wireless communication system needs to be defined, and the effect on the legacy terminals due to the new frame structure has to be kept to a minimum.

Also, a cellular system such as the LTE(-A) system or 802.16m uses a resource allocation method based on eNB scheduling.

In a system employing the eNB scheduling-based resource allocation method, a UE having data to transmit (i.e., UL data) requests a resource for transmitting the corresponding data from the eNB before transmitting the data.

The scheduling request of a UE may be performed through SR (Scheduling Request) transmission to the PUCCH or BSR (Buffer Status Report) transmission to the PUSCH.

Also, when a resource for transmitting an SR or a BSR is not allocated to the UE, the UE may request an uplink resource from the eNB through the RACH procedure.

The eNB which has received the scheduling request from the UE allocates an uplink resource for the corresponding UE through a downlink control channel (i.e., UL grant message and DCI in the case of the LTE(-A)).

At this time, a UL grant transmitted to the UE may inform of the subframe to which the resources allocated to the UE belong by using explicit signaling. However, a time point between the UE and the eNB may be defined by using resource allocation for a subframe after specific time (for example, 4 ms in the case of LTE).

As described above, allocating resources by the eNB to the UE after X ms (for example, 4 ms in the case of LTE(-A)) means allocating resources for the UE by taking into account all of the time periods required for the UE to receive and decode a UL grant and to prepare and encode the data to transmit.

FIG. 20 illustrates a timeline for a UE to transmit actual data through a five-step scheduling request procedure by using the PUCCH SR resources.

As shown in FIG. 20, the UE may transmit actual uplink data after about 17 ms from the time the SR signal is transmitted.

At this time, the SR resources allocated to the UE may be allocated on the PUCCH to have a specific period, which may be allocated with a period of at least 1 ms to a maximum of 80 ms.

Here, if an SR with a period of 1 ms is allocated to the corresponding UE, the average time for the UE to wait for the PUCCH resource for SR transmission becomes 0.5 ms, and the time delay for the eNB to transmit data through scheduling request occupies 17.5 ms.

If the UE has an uplink resource allocated previously by the eNB, the UE may transmit a request for resources for newly generated data by using the previously allocated resource.

Or, the UE may request additional resources from the eNB by transmitting a BSR along with the data transmitted through the previously allocated resources.

In this case, as shown in FIG. 21, after the UE transmits an BSR, a delay of 9 ms occurs until uplink data are transmitted.

If the UE does not have the PUCCH SR resource or the PUSCH resource allocated by the eNB, or uplink synchronization is not met, the UE may request a resource for newly generated data by using the RACH procedure.

In other words, as shown in FIG. 22, the UE encounters a delay of 17 ms from the time the UE transmits the RACH preamble to the eNB to the time uplink data are transmitted.

At this time, the PRACH resource that may be used for transmitting the RACH preamble may be configured to have a specific period for each cell. If it is assumed that the PRACH resource has a period of at least 1 ms, an average data transmission delay of 17.5 ms may occur.

As described with reference to FIGS. 20 to 22, the UE becomes capable of transmitting actual data after experiencing a delay of at least 9 ms up to a delay of 17.5 ms for transmitting uplink data.

The operation above is advantageous in that resource utilization is maximized as the eNB allocates resources optimized for a channel condition of each UE but at the same time, brings an adverse effect of generating a delay in UL data transmission.

With an increase in the demand for supporting various real-time application services such as healthcare, traffic safety, disaster safety, and remote medical diagnosis, the goal of the 5G communication technology is to construct an ultra-low delay system providing an extremely short response time so that a user does not feel unnatural even if tactile information, which is one of the five senses of humans most sensitive to delay time, is provided through the Internet (target delay: E2E or Radio 1 ms).

To provide a 5G communication service such as described above, a delay in data transmission has to be minimized, but communication systems of today are designed to generate the following delays additionally in data transmission.

Downlink Data Transmission Delay
Connected UE: 0 ms (no delay)
Dormant UE: an average delay of 1 ms to 1,280 ms occurs due to a DRX cycle set to the UE (short DRX cycle: 2~640 ms, long DRX cycle: 10~2560 ms)
Idle UE: an average delay of 160 ms to 1,280 ms plus initial access occurs due to a paging DRX cycle set to the UE (paging cycle: 320-2560 ms, initial access: 50 ms~100 ms (LTE-A: 50 ms/LTE: 100 ms))
Uplink Data Transmission Delay
Synchronized & dormant UE: a delay of 17.5 ms occurs (5 step SR)
Unsynchronized UE: a delay of 17.5 ms occurs (SR through RACH)
A connected UE to which uplink resources are allocated: 9 ms (data transmission through BSR transmission)

As described above, in order for a UE to transmit/receive data, various types of time delay may occur according to the condition of the UE; in particular, delays in receiving downlink data may occur with various lengths for a dormant UE or an UE in the idle state.

However, as one of means to reduce power consumption of a UE, a relationship between data reception delay and power consumption should be examined in more detail.

In the case of data transmission delay for uplink data transmission, although a UE is able to transmit data whenever needed, an additional delay occurs unavoidably as the UE employs the data transmission method based on the scheduling of the eNB.

In the future 5G communication, a service in which information about an accident that may occur from a specific event at unpredictable time by various end users such as humans or machines (vehicles, sensors, and the like) or information about a current state of the accident is broadcast promptly to eNBs or nearby UEs/users so that a secondary accident may be prevented or an emergency situation may be handled quickly is expected to be a primary low latency service of the 5G system.

The aforementioned low latency service enables a subsequent procedure to be performed by usually transmitting uplink data quickly.

In this regard, fast transmission of uplink data, which is an initiation step of the corresponding service, is one of the primary factors influencing the overall service delay.

Due to the reasons described above, to support a low latency service of the new 5G communication, a delay in the uplink data transmission is regarded as a crucial factor that has to be reduced.

In what follows, described will be a method for allocating data resources in an efficient manner when data are transmitted and received by using a short TTI frame structure to support the low latency radio (LLR) according to the present invention.

The methods of the present invention described below are performed on the basis of a short TTI (Transmit Time Interval) frame structure as illustrated in FIG. 23 and are described by the technical properties as shown in items 1 to 5. However, it should be noted that the methods of the present invention are not limited to the short TTI frame structure of FIG. 23 but may also be applied to the short TTI frame structure having various other forms.

FIG. 23 illustrates one example of a short TTI frame structure according to the present invention.

Referring to FIG. 23, in a downlink and an uplink radio frame, a plurality of short TTIs (2320) lasting less than 1 ms are included in the legacy TTI 2310 of 1 ms, and the boundaries thereof are aligned with the legacy TTI.

Here, the legacy TTI of 1 ms represents one legacy subframe. In what follows, for the convenience of description, a legacy TTI of 1 ms or a legacy subframe of 1 ms is referred to as a 'legacy TTI', and a TTI the duration of which is shorter than 1 ms is referred to as a 'short TTI'.

More specifically, the legacy TTI comprises two slots, and each slot further comprises a first short TTI 2330 and a second short TTI 2340. Here, each slot may correspond to one short TTI.

The first short TTI may comprise 4 symbols, and the second short TTI may comprise 3 symbols.

In the downlink (radio) frame, the first and the second short TTI may include a PDCCH and a PDSCH; and in the uplink (radio) frame, the first and the second short TTI may include a PUCCH and a PUSCH.

The positions of the PDCCH, PDSCH, PUCCH, and PUSCH within a TTI may be the same as those in the legacy frame structure.

Also, the PDCCH, PDSCH, PUCCH, and PUSCH transmitted from within a short TTI may be denoted by sPDCCH, sPDSCH, sPUCCH, and sPUSCH respectively by adding 's', abbreviation of short, to the original terms.

In particular, the PDCCH 2350 of the first short TTI may be defined as a channel for transmitting control information about uplink and downlink transmission, and the PDCCH 2360 of the second short TTI may be defined as a channel transmitting only the control information about downlink transmission.

1. A first short TTI comprising 4 symbols and a second short TTI comprising 3 symbols
2. Reference signal (RS) design for uplink (UL) transmission
3. Scheduling-based uplink resource allocation and contention (resource) based uplink resource allocation
4. Allocation of physical resource block (PRB) and PHICH index for a short TTI The UE operation based on the short TTI frame structure according to the present invention In what follows, the technical properties expressed by the items 1 to 5 above will be described one by one in more detail with reference to related drawings.

4 Symbol/3 Symbol Short TTI

As described above, the present invention proposes a new physical layer frame structure for achieving data transmission/reception of OTA (Over The Air) 1 ms.

The new physical layer frame structure according to the present invention defines a short transmission unit structure of about 0.2 ms, namely a short TTI structure.

Even if the new physical layer frame structure is employed as a dedicated carrier, time alignment is assumed to be maintained with the 1 ms TTI (legacy TTI) comprising 14 symbols by taking into account carrier aggregation (CA) with the existing LTE(-A) system.

Due to this property, as shown in FIG. 24, a downlink and uplink frame structure based on the short TTI may define a slot having a short TTI of two modes (or types). This structure may be applied to both of the uplink frame and downlink frame.

The short TTI of the two modes may be defined by a first short TTI comprising 4 symbols and a second short TTI comprising 3 symbols.

In other words, one slot may comprise one first short TTI and one second short TTI. However, the structure described above is only an example, and one slot may include at least one first short TTI and/or at least one second short TTI.

Also, the control channels (sPDCCH, sPUCCH) within the short TTI of two modes may be transmitted through a specific symbol(s) as shown in FIG. 24.

Here, the sPDCCH (short PDCCH) or sPDSCH (short PDSCH) represents the PDCCH or PDSCH transmitted from within a short TTI.

Also, the sPUCCH (short PUCCH) or sPUSCH (short PUSCH) represents the PUCCH or PUSCH transmitted from within a short TTI.

The aforementioned expressions are introduced to distinguish them from the PDCCH, PDSCH, PUCCH, and PUSCH transmitted from within a legacy TTI.

More specifically, in the case of a downlink frame, the sPDCCH may be transmitted from a first or second symbol of each short TTI.

Also, in the case of an uplink frame, the sPUCCH may be transmitted through the n lowest or highest resource blocks (RBs).

The first short TTI may be denoted as a 1st TTI, and the second short TTI may be denoted as a 2nd TTI.

Also, to implement fast uplink data transmission/reception proposed by the present invention, contention resources may be set within an uplink frame including a short TTI.

Here, a UE may perform asynchronous transmission of UL data depending on its (UE's) condition through the set contention resources, and when synchronization between the UE and the eNB is not accurate (or does not coincide), interference over neighbor frequency bands may become severe.

Therefore, to solve the aforementioned problem, the present invention distinguishes the contention resources from the scheduling resources by setting TDM (Time Division Multiplexing) scheme for the contention resources rather than the FDM (Frequency Division Multiplexing) scheme.

Therefore, from the new physical layer frame structure described with reference to FIGS. 23 and 24, the first short TTI (1st TTI) or the second short TTI (2nd TTI) may be defined as contention resources.

Preferably, by taking account of utilization of system resources, the second short TTI comprising 3 symbols (or with a length of 3 symbols) may be used as contention resources rather than the first short TTI comprising 4 symbols (or with a length of 4 symbols).

Due to the reasons described above, in what follows, a method for transmitting/receiving UL data quickly by setting the second short TTI as a contention resource will be described with an example.

In other words, when contention resources are defined in terms of TDM scheme, resources allocated for the data transmitted through scheduled resources may be transmitted for each slot of downlink frames.

Also, the downlink control information (DCI) for uplink (transmission) is defined to transmit only the first symbol of a downlink slot.

In other words, downlink control information about uplink transmission is transmitted from the first symbol of the first short TTI, and downlink control information about downlink transmission is transmitted from the second symbol of the first short TTI and the first symbol of the second short TTI.

Here, the downlink control information about uplink transmission may be the DCI format that transmits a UL grant.

Also, the downlink control information about uplink transmission may include the PHICH (Physical HARQ Indication Channel) that transmits ACK/NACK information with respect to the uplink data (UL data).

FIG. 25 illustrates one example of a frame structure including a short TTI according to the present invention.

As shown in FIG. 25, the downlink control information for uplink transmission is transmitted from the first symbol of the first short TTI of a downlink frame.

The frame structure as shown in FIG. 25 is constructed so that after an eNB transmits to a UE downlink control information for uplink transmission of the UE, the UE continuously receive downlink control information related to downlink transmission.

Also, the sPDCCH of a first short TTI may be transmitted through 1 or 2 symbols, and the sPDCCH of a second short TTI may be transmitted through 1 symbol.

Moreover, although the sPDCCH may be allocated over the whole frequency band, it may also be allocated only to part of subbands for the efficiency of utilizing PDSCH resources.

DMRS (DeModulation Reference Signal) for PUCCH/PUSCH in the Short TTI Frame Structure FIG. 26 illustrates one example of a DMRS position in the UL frame structure based on a short TTI according to the present invention.

As shown in FIGS. 26*a* and 26*b*, the DMRS 2610 in the PUSCH is transmitted through one symbol located in the middle of each short TTI.

In other words, the DMRS of the PUSCH is transmitted through the second symbol for the case of the first short TTI of 4 symbols, and the DMRS of the PUSCH is transmitted through the second symbol for the case of the second short TTI of 3 symbols.

Also, the DMRS 2620 of the PUCCH is transmitted through one or two symbols.

In other words, the DMRS of the PUCCH is transmitted through two symbols for the case of the first short TTI of 4 symbols, and the DMRS in the PUCCH is transmitted through one symbol for the case of the second short TTI of 3 symbols.

Meanwhile, as shown in FIG. 26*c*, it may be defined so that two short TTIs are made to overlap in the fourth symbol within each slot, and the DMRS is transmitted with respect to two short TTIs commonly from the corresponding fourth symbol.

In the case of FIG. 26*c*, separate OCs (Orthogonal Covers) may be allocated for the DMRSs of individual short TTIs to be distinguished from each other.

In other words, the DMRS for the first short TTI is made to be transmitted from the fourth symbol of the first short TTI, and the DMRS for the second short TTI is made to be transmitted from the first symbol of the second short TTI.

Accordingly, a downlink control channel may also be defined to transmit uplink related control information from the fourth symbol of each slot to maintain time alignment with respect to the short TTI in an uplink frame.

In the case of the structure of FIG. 26*c*, since the uplink data region is extended, more uplink data may be transmitted.

Also, as shown in FIG. 26c, the RS of the PUCCH may be defined to allocate two RSs with respect to the first short TTI or the second short TTI.

Scheduling/Contention-Based UL Resource Allocation

To implement fast UL data transmission of a UE, the future 5G wireless communication proposes to define contention resources.

Therefore, as described above, the present invention defines a method for allocating contention resources according to the TDM scheme.

Also, to allocate contention resources according to the TDM scheme, the present invention defines to set contention resources to either of the first short TTI or second short TTI.

However, to maximize resource utilization of a system, it is preferable to set the contention resources to the second short TTI to which a less amount of resources is allocated.

In this case, scheduling-based resources may be allocated to the first short TTI.

FIG. 12, FIGS. 20 to 22 should be reference for the description of a scheduling-based UL resource allocation method.

Also, the contention-based UL resource allocation method according to the present invention retransmits UL data by using the contention resources or scheduled resources when (1) the UE transmits the UL data to the eNB by using the contention resources of a short TTI (for example, second short TTI) without involving a UL grant, (2) the UE receives a response (ACK/NACK) with respect to the UL data from the eNB through the PHICH, or (3) the UE receives NACK from the eNB through the PHICH.

Here, the scheduled resource may indicate the resource allocated by the scheduling-based UL resource allocation method of FIG. 12.

Allocation of Physical Resource Block (PRB) and PHICH Index for Short TTI

As described in FIGS. 23 and 25, in the frame structure including the first and the second short TTI, when control information for UL transmission (for example, UL grant and PHICH) is transmitted through one symbol for each slot, there may occur two problems as described below.

(1) Collision of Different Time Resource Allocations when UL Resources are Allocated to the UE In other words, in the case of (1) (as shown in FIGS. 23 and 25), since the eNB allocates UL resources for the first and the second short TTI to the UE only though the first symbol of the first short TTI, the UE may not know whether the UL resource allocation through the first symbol of the first short TTI corresponds to UL resource allocation for the first short TTI or for the second short TTI.

(2) Collision of PHICH Resources Due to Mapping to the Same Frequency Resources when PHICH Resources are Mapped In other words, the PHICH resource in the current LTE (-A) system is mapped in the form of an index pair as shown in Eqs. 2 and 3 above according to the lowest PRB index of the PUSCH resource.

However, the PRB index is defined only for one TTI (1 ms).

Therefore, according to the present invention, if two short TTIs (the first and the second short TTI) are defined, a PHICH resource mapping method that may be distinguished for each short TTI is needed.

Therefore, in what follows, as a method for solving the problems (1) and (2), two new methods are defined as follows.

Method 1: method for allocating a new PHY RB index

Method 2: modification of resource block assignment field of the DCI format 0 and the lowest PRB index field of the PHICH.

First, method 1 is described.

Method 1: Allocation of a New PHY RB Index

In other words, in a physical frame structure including the short TTI according to the present invention, method 1 defines to allocate consecutive PRB indices to the first short TTI and the second short TTI.

FIG. 27 illustrates one example of a method for allocating a new physical resource block index according to the present invention.

In other words, as shown in FIG. 27, the lowest PRB index starts from the lowest frequency band of the first short TTI and increases by '1' every physical RB (PRB).

Here, if the number of PRBs across the whole frequency band is NULRB, the PRB index with respect to the highest frequency band of the first short TTI becomes NULRB−1.

Therefore, the PRB index of the second short TTI is defined to be allocated consecutively to the NULRB−1 of the first short TTI.

In other words, the PRB index for the lowest frequency band of the second short TTI becomes NULRB. The PRB index is increased by '1' every PRB, and 2NULRB−1 is allocated to the PRB index for the highest frequency band Next, method 2 is described.

Method 2: Modification of the Resource Allocation Block Field of DCI Format 0 and the Lowest PRB Index (IPRB RB) Field of PHICH Suppose the new physical frame structure (including the short TTI) of the present invention comprises one subframe (SF) with respect to one TTI in the same way for a legacy frame, and a PRB index is allocated to the subframe. Then it is necessary for the DCI format 0 for uplink resource allocation to distinguish two short TTIs (first short TTI and second short TTI) designated as time resources.

For the distinction, two methods may be defined as follows.

Method 2-1: 1-bit indicator indicating a subframe offset for distinguishing two short TTIs from each other Method 2-2: modification of RIV of a resource block allocation field First, the method 2-1 is described with reference to FIG. 28.

FIG. 28 illustrates a structure of a new DCI format 0 according to the present invention.

As described in FIG. 28, suppose there are two TTIs with different lengths (first short TTI and second short TTI) in each slot, and control information about the two TTI is transmitted through a downlink control channel in slot units. Then an indicator (or identifier) is needed, which informs of whether uplink resource allocation is resource allocation for the first short TTI or resource allocation for the second short TTI.

The indicator 2810 is an indicator for distinguishing two short TTIs and may be defined as information for indicating a subframe offset. The indicator is included in the DCI format 0.

As one example, when the indicator is set to '0b0', UL resource allocation indicates resource allocation with respect to the first short TTI. If the indicator is set to '0b1', UL resource allocation indicates resource allocation with respect to the second short TTI.

For the purpose of reference, the remaining fields of FIG. 28 are described briefly.

1) Carrier indicator: comprises 0 or 3 bits

2) Flag for distinguishing the DCI format 0 from format 1A—comprises 1 bit where a value of 0 indicate the DCI format 0, and the value of 1 indicates the DCI format 1A.

3) Frequency hopping flag (FH)—comprises 1 bit. If necessary, the most significant bit (MSB) of the corresponding resource allocation of this field may be used for multi-cluster allocation.

4) Resource block assignment 2820

MCS (Modulation and coding scheme) and RV (Redundancy Version)—comprises 5 bits

6) NDI (New Data Indicator)—comprises 1 bit

7) TPC (Transmit Power Control) command for PUSCH—comprises 2 bits

8) CS (Cyclic Shift) for DMRS (Demodulation Reference Signal) and index of OC/OCC (Orthogonal Cover/Orthogonal Cover Code)—comprises 3 bits 9) Uplink index—comprises 2 bits. This field is defined only for the TDD operation according to the uplink-downlink configuration 0.

10) DAI (Downlink Assignment Index)—comprises 2 bits. This field is defined only for the TDD operation according to the uplink-downlink configuration 1-6.

11) CSI (Channel State Information) request—comprises 1 or 2 bits. Here, a two-bit field is applied only when the corresponding DCI is mapped in a UE-specific manner by C-RNTI (Cell-RNTI) to the UE to which one or more downlink cells are set.

12) SRS (Sounding Reference Signal) request—comprises 0 or 1 bit. Here, this field is defined only when a scheduling PUSCH is mapped in a UE-specific manner by the C-RNTI.

13) Resource allocation type—comprises 1 bit.

When the number of information bits within the DCI format 0 is smaller than the payload size of the DCI format 1A (including additional padding bits), zeros are inserted to the DCI format 0 so that the payload size of the DCI format 1A is equal to the number of information bits.

Next, method 2-2 will be described with reference to FIG. 29.

FIG. 29 illustrates one example of a method for allocating a PRB index by using a resource indication value (RIV) according to the present invention.

First, for the convenience of understanding, a UL resource allocation method will be described briefly, and then the proposed method by the present invention will be described.

Two types of uplink resource allocation methods are supported for the PDCCH/EPDCCH transmitting the uplink DCI format (for example, DCI format 0).

The uplink DCI format supports a method for indicating one resource comprising consecutive resource blocks by using uplink resource allocation (type 0) and a method for indicating two resources comprising consecutive resource blocks by using uplink resource allocation (type 1).

When the uplink DCI format does not include a resource allocation type bit, only resource allocation type 0 is supported.

Meanwhile, suppose the uplink DCI format includes a resource allocation type bit. If the resource allocation type bit is '0', it indicates resource allocation type 0, and resource allocation type 1, otherwise. The UE interprets the resource allocation field according to the resource allocation type bit within the PDCCH/EPDCCH transmitted a detected uplink DCI format.

The resource allocation information according to the uplink resource allocation type 0 indicates a virtual resource block (VRB) index ($n_{VRB}$) allocated consecutively to a scheduled UE. The resource allocation field within a scheduling grant includes a start resource block ($RB_{START}$) and a resource indication value (RIV) corresponding to the length ($L_{CRBs}$) of resource blocks allocated consecutively.

IF $(L_{CRBs}-1) \leq \lfloor N_{RB}^{UL}/2 \rfloor$ is met, the RIV is defined by Eq. 4 below but defined by Eq. 5, otherwise.

Here, $N_{RB}^{UL}$ represents a total number of resource blocks (RBs) within the uplink bandwidth.

$$RIV = N_{RB}^{DL}(L_{CRBs}-1)+RB_{start} \qquad [\text{Eq. 4}]$$

$$RIV = N_{RB}^{DL}(N_{RB}^{DL}-L_{CRBs}+1)+(N_{RB}^{DL}-1-RB_{start}) \qquad [\text{Eq. 5}]$$

Meanwhile, resource allocation information about the uplink resource allocation type 1 indicates two resource block sets for a scheduled UE. Here, each set includes one or more consecutive resource block groups (RBG).

The size of an RBS is shown in Table 6.

TABLE 6

| System Bandwidth $N_{RB}^{UL}$ | RBG Size (P) |
| --- | --- |
| ≤10 | 1 |
| 11-26 | 2 |
| 27-63 | 3 |
| 64-110 | 4 |

To indicate resource allocation, a combination index (r) which corresponds to a start RBG index $S_0$ and the last RBG index $S_1-1$ of the resource block set 1 and a start RBG index $S_2$ and the last RBG index $S_3-1$ of the resource block set 2 is defined by Eq. 6 below.

$$r = \sum_{i=0}^{M-1} \binom{N - s_i}{M - i} \qquad [\text{Eq. 6}]$$

In Eq. 6, M=4, and N=$\lceil N_{RB}^{UL}/P \rceil+1$.

The method according to the present invention defines to modify the resource indication value (RIV) of an existing resource block allocation field for each short TTI by using Eqs. 7 to 10 below.

In other words, in the case of an RIV with respect to the first short TTI, Eqs. 7 and 8 are applied, while, in the case of an RIV with respect to the second short TTI, Eqs. 9 and 10 are applied.

Also, if $(L_{CRBs}-1) \leq \lfloor N_{RB}^{UL}/2 \rfloor$ is met, the RIV is defined by Eqs. 7 and 9 but by Eqs. 8 and 10, otherwise.

Here, $N_{RB}^{UL}$ represents a total number of resource blocks (RBs) in the uplink bandwidth.

$$RIV = N_{RB}^{DL}(L_{CRBs}-1) + RB_{start} \qquad [\text{Eq. 7}]$$

$$RIV = N_{RB}^{DL}(N_{RB}^{DL} - L_{CRBs}+1) + (N_{RB}^{DL} - 1 - RB_{start}) \qquad [\text{Eq. 8}]$$

$$RIV = N_{RB}^{UL}\left(\left\lfloor \frac{N_{RB}^{UL}}{2} \right\rfloor + 1\right) + N_{RB}^{DL}(L_{CRBs} - 1) + RB_{start} \qquad [\text{Eq. 9}]$$

$$RIV = N_{RB}^{UL}\left(\left\lfloor \frac{N_{RB}^{UL}}{2} \right\rfloor + 1\right) + N_{RB}^{DL}(N_{RB}^{DL} - L_{CRBs} + 1) + (N_{RB}^{DL} - 1 - RB_{start}) \qquad [\text{Eq. 10}]$$

For example, when NULRB=6, an RIV of 0 to 23 is allocated with respect to the first short TTI, and an RIV of 24 to 27 is allocated with respect to the second short TTI.

Also, when NULRB=15, an RIV of 0 to 119 is allocated with respect to the first short TTI, and an RIV of 120 to 239 is allocated with respect to the second short TTI.

Also, when the HARQ ACK/NACK for UL data transmitted to different resources through two TTIs (first short TTI and second short TTI) is transmitted through the same PHICH channel, the present invention has to distinguish the HARQ ACK/NACK with respect to the UL data transmitted to different time resources.

Therefore, the present invention applies Eqs. 2 and 3 used for mapping to the PHICH resource to each short TTI as a method for mapping to different PHICH resources and newly defines $I_{PRB\_RA}$ in the second short TTI as follows.

In other words, while PHICH resource mapping in each short TTI employs Eqs. 2 and 3, $I_{PRB\_RA}$ is defined for PHICH resource mapping in the second short TTI as follows.

At the time of PHICH resource mapping in the second short TTI, when the applied $I_{PRB\_RA}$ is a first transmission block related to the PDCCH or when the number of transmission blocks recognized manually in the absence of a related PDCCH is not the same as the number of transmission blocks indicated by the latest PDCCH related to the correspond PUSCH, $I_{PRB\_RA}$ is the same as $I_{PRB\_RA}^{lowest\_index}+N_{RB}^{UL}$.

On the other hand, in the case of a second transmission block of the PUSCH related to the PDCCH, $I_{PRB\_RA}$ is the same as $I_{PRB\_RA}^{lowest\_index}+N_{RB}^{UL}+1$.

Here, $I_{PRB\_RA}^{lowest\_index}$ corresponds to the lowest PRB index of the first slot of the corresponding PUSCH transmission.

UE Operation in a New Physical Frame Structure

In a new physical frame structure including a short TTI according to the present invention, a UE may operate in the following three situations.

(1) A situation in which contention resources are not set
(2) A situation in which contention resources and scheduled resources are set according to the TDM scheme
(3) A situation in which urgent resources are used by an urgent signal (US)

A method for operating a UE according to the situations (1) to (3) will be described in detail with reference to FIGS. 30 to 33.

FIG. 30 illustrates one example of a method for transmitting and receiving uplink data by using a physical frame structure according to the present invention.

FIG. 30 illustrates a method for operating a UE in the situation (1) above in a new physical frame structure according to the present invention, namely when contention resources are not set.

When contention resources are not set, a method for allocating uplink resources described with reference to FIG. 12 may be applied.

In FIG. 30, a portion indicated by solid lines represents a procedure related to a first short TTI, and a portion indicated by dotted lines represents a procedure related to a second short TTI.

In other words, when UL data to transmit arrive at the buffer of the UE, the UE transmits an SR (Scheduling Request) or a BSR (Buffer Status Report) to the eNB through a UL frame including a short TTI to request uplink resources S3010.

Afterwards, the eNB transmits a UL grant to the UE through a downlink control channel (for example, sPDCCH) S3020.

Here, the UL grant may include UL grants for the first and the second short TTI.

Also, the UL grant may include an indicator indicating whether the corresponding UL grant described with reference to FIG. 28 is related to UL resource allocation with respect to the first short TTI or the second short TTI.

More specifically, the eNB may transmit a UL grant CRC masked with a UE ID by using a downlink channel of a specific symbol for controlling an uplink channel.

In other words, as described in FIGS. 23 and 25, the eNB may transmit downlink control information (for example, a UL grant CRC masked with a UE ID) about UL transmission to the UE through a first symbol of the first short TTI from a DL frame.

The UL grant may be transmitted to the UE in slot units, and the UL grant represents scheduling information about UL data transmission resources after a specific time period from the time the UL grant is transmitted.

As described above, the UL grant may include information about specific time resources (information for determining whether resource allocation is related to the first short TTI or the second short TTI).

Therefore, the UE may receive resources for a specific SF by receiving from the eNB not only the information about frequency resources but also information about time resources.

Afterwards, the UE transmits UL data to the eNB on the basis of the UL grant received at the S3020 step (S3030).

Afterwards, the UE monitors the downlink control channel (PHICH) during a specific time period by using the definitions and equations proposed in the 'method for allocating a PRB and a PHICH index with respect to a short TTI' to receive the PHICH ACK/NACK for UL data from the eNB S3040.

Afterwards, the UE may perform retransmission of UL data to the eNB on the basis of the received PHICH ACK/NACK.

In other words, the UE performs retransmission of UL data when NACK is received through the PHICH S3050.

FIG. 31 illustrates another example of a method for transmitting and receiving uplink data by using a physical frame structure according to the present invention.

FIG. 31 illustrates a method for operating a UE in the situation (2) above in a new physical frame structure according to the present invention, namely when contention resources and scheduled resources are set according to TDM scheme.

In FIG. 31, a portion indicated by solid lines represents a procedure related to a first short TTI, and a portion indicated by dotted lines represents a procedure related to a second short TTI.

In other words, a scheduling-based uplink resource allocation method is applied for the first short TTI while a contention-based uplink resource allocation method is applied for the second short TTI.

Referring to FIG. 31, when UL data to transmit arrive at the buffer, the UE determines whether to transmit the UL data by using the contention resources or through a scheduling request (namely scheduling-based transmission).

If the UE determines to transmit the UL data through a scheduling request, a UL data transmission and reception procedure is performed through the method of FIG. 30.

If the UE determines to transmit the UL data through contention resources, the UE transmits the UL data directly to the eNB through contention resources without SR or BSR transmission.

FIG. 31 assumes that UL data through the first short TTI are transmitted by scheduling-based transmission, and UL data through the second short TTI are transmitted by contention-based transmission.

Here, the contention resources may be set for the second short TTI of each slot.

At this time, the UE which has transmitted the UL data through the contention resources monitors the downlink PHICH channel during a specific time period by using the definitions and equations proposed in the 'method for allocating a PRB and a PHICH index with respect to a short TTI' to check whether the corresponding UL data have been successfully transmitted.

Afterwards, the UE may perform retransmission of UL data to the eNB on the basis of the received PHICH ACK/NACK.

In other words, the UE performs retransmission of UL data when NACK is received through the PHICH.

FIGS. 32 and 33 illustrate still other examples of a method for transmitting and receiving uplink data by using a physical frame structure according to the present invention.

FIGS. 32 and 33 illustrate a method for operating a UE in the situation (3) above in a new physical frame structure according to the present invention, namely when urgent resources are used by an urgent signal (US).

First, when urgent data to transmit arrive at the buffer, the UE requests resource allocation for the urgent data by transmitting an urgent signal (US) to the eNB.

Afterwards, the UE may receive the UL resources (for transmission of urgent data) allocated to itself from the eNB through the PHICH.

In other words, the UE may receive the UL resources by monitoring the PHICH channel transmitted for each slot.

Here, the PHICH channel may be transmitted to the UE through the first or the second symbol of the first short TTI.

Next, the UE, which has checked its uplink resources through the PHICH, transmits urgent data to the eNB through the allocated resources.

FIG. 32 illustrates one example in which the UE transmits a US to the eNB from within the first short TTI, and FIGS. 32a and 32b illustrate the case in which (1) urgent data are transmitted from the subframe (SF) right after the PHICH reception subframe (FIG. 32b) or (2) urgent data are transmitted one SF later from the PHICH reception subframe (FIG. 32a).

Differently from FIG. 32, FIG. 33 illustrates one example in which the UE transmits a US from within the second short TTI, and FIGS. 33a and 33b illustrate the case in which (1) urgent data are transmitted from the subframe (SF) right after the PHICH reception subframe (FIG. 33b) or (2) urgent data are transmitted one SF later from the PHICH reception subframe (FIG. 33a).

FIG. 34 illustrates latency in wireless transmission and reception in the short TTI radio frame structure according to the present invention.

FIG. 34 illustrates latency in wireless transmission and reception in view of implementation of downlink transmission and reception when 1 TTI is configured to comprise 3 symbols (namely 0.213 ms).

Referring to FIG. 34, a propagation delay (PD) is generated from the time the eNB starts transmission of downlink data to the time the UE receives the downlink data.

And a buffering delay is generated as the UE buffers the downlink data before decoding the downlink data.

The delay due to buffering of the UE may take about 0.071 ms in total.

A processing delay due to decoding of the downlink data (and control information) in the UE may take less than about 0.525 ms.

In this manner, the one-way OTA (Over-The-Air) latency from the eNB to the UE may take less than about 0.6 ms.

And the delay due to A/N (ACK/NACK) preparation of the UE (for example, ACK/NACK encoding) and the propagation delay (PD) generated during transmission of the A/N takes less than about 0.3 ms in total.

As described above, the total roundtrip OTA latency from a transmitter-side (for example, eNB) to a receiver-side (for example, UE) and back to the transmitter-side until the ACK/NACK is received may occupy about 4 ms.

As a result, by using the short TTI (wireless) frame structure according to the present invention, the total roundtrip OTA latency is reduced by about 3 ms compared with the result of FIG. 19.

The Device to which the Present Invention May be Applied in General

FIG. 35 illustrates a block diagram of a wireless communication device to which the methods according to the present invention may be applied.

Referring to FIG. 35, a wireless communication system comprises an eNB 3510 and a plurality of UEs 3520 located within the range of the eNB 3510.

The eNB 3510 comprises a processor 3511, memory 3512, and RF (Radio Frequency) unit 3513. The processor 3511 implements the functions, processes and/or methods described with reference to FIGS. 1 to 34. Layers of a wireless interface protocol may be implemented by the processor 3511. The memory 3512, being connected to the processor 3511, stores various kinds of information to operate the processor 3511. The RF unit 3513, being connected to the processor 3511, transmits and/or receives a radio signal.

The UE 3520 comprises a processor 3521, memory 3522, and RF unit 3523. The processor 3521 implements the functions, processes and/or methods described with reference to FIGS. 1 to 34. Layers of a wireless interface protocol may be implemented by the processor 3521. The memory 3522, being connected to the processor 3521, stores various kinds of information to operate the processor 3521. The RF unit 3523, being connected to the processor 3521, transmits and/or receives a radio signal.

The memory 3512, 3522 may be installed inside or outside the processor 3511, 3521 and may be connected to the processor 3511, 3521 via various well-known means.

Also, the eNB 3510 and/or the UE 3520 may be equipped with a single antenna or multiple antennas.

The embodiments described above are combinations of constituting elements and features of the present invention in a predetermined form. Each individual element or feature has to be considered as optional except where otherwise explicitly indicated. Each individual element or feature may be implemented solely without being combined with other elements or features. Also, it is also possible to construct the embodiments of the present invention by combining a portion of the elements and/or features. A portion of a structure or feature of an embodiment may be included in another embodiment or may be replaced with the corresponding structure of feature of another embodiment. It should be clearly understood that the claims which are not explicitly cited within the technical scope of the present invention may be combined to form an embodiment or may be included in a new claim by an amendment after application.

The embodiments of the present invention may be implemented by various means such as hardware, firmware, software, or a combination thereof. In the case of hardware implementation, one embodiment of the present invention may be implemented by using one or more of ASICs (Application Specific Integrated Circuits), DPSs (Digital Signal Processors), DSPDs (Digital Signal Processing Devices), PLDs (Programmable Logic Devices), FPGAs (Field Programmable Gate Arrays), processors, controllers, micro-controllers, and micro-processors.

In the case of implementation by firmware or software, one embodiment of the present invention may be implemented in the form of modules, procedures, functions, and the like which perform the functions or operations described above. Software codes may be stored in the memory and activated by the processor. The memory may be located inside or outside of the processor and may exchange data with the processor by using various well-known means.

It is apparent for those skilled in the art that the present invention may be embodied in other specific forms without departing from the essential characteristics of the present invention. Therefore, the detailed descriptions above should be regarded as being illustrative rather than restrictive in every aspect. The technical scope of the present invention should be determined by a reasonable interpretation of the appended claims, and all of the modifications that fall within an equivalent scope of the present invention belong to the technical scope of the present invention.

INDUSTRIAL APPLICABILITY

This document discloses a method for transmitting and receiving data in a wireless communication system with examples based on the 3GPP LTE/LTE-A system; however, the present invention may be applied to various other types of wireless communication systems in addition to the 3GPP LTE/LTE-A system.

The invention claimed is:

1. A method for transmitting and receiving data in a wireless communication system, the method performed by a user equipment (UE) and comprising:
    transmitting and receiving the data with an evolved Node B (eNB) through a radio frame,
    wherein the radio frame includes a downlink (DL) radio frame and an uplink (UL) radio frame,
    wherein the radio frame includes a legacy transmission time interval (TTI) and a short TTI,
    wherein the legacy TTI includes two slots,
    wherein each slot included in the legacy TTI includes a first short TTI and a second short TTI,
    wherein the first short TTI and the second short TTI include a control region to which a control channel is allocated and a data region to which a data channel is allocated,
    wherein downlink control information (DCI) related to uplink transmission of the first short TTI and the second short TTI is allocated to a control region of the first short TTI belonging to the downlink radio frame, and
    wherein, when a highest physical resource block (PRB) index of the first short TTI is allocated as highest PRB index of a frequency band configured for the UE, a lowest PRB index of the second short TTI is allocated consecutively to the highest PRB index of the first short TTI.

2. The method of claim 1, wherein the first short TTI comprises four symbols, and the second shot TTI comprises three symbols.

3. The method of claim 2, wherein the control region of the first short TTI comprises one symbol or two symbols, and a control region of the second short TTI comprises one symbol.

4. The method of claim 1, further comprising transmitting a demodulation reference signal (DMRS) to the eNB through a short TTI of the radio frame.

5. The method of claim 4, wherein the DMRS is transmitted through one symbol within a data region of the first short TTI and the second short TTI.

6. The method of claim 4, wherein the DMRS is transmitted through two symbols within the control region of the first short TTI and is transmitted through one symbol within the control region of the second short TTI.

7. The method of claim 4, wherein the DMRS is transmitted through an overlapping region if the first short TTI overlaps a specific symbol of the second short TTI.

8. The method of claim 1, further comprising:
    receiving, from the eNB, a DCI format including a UL grant through the control region of the first TTI belonging to the downlink radio frame.

9. The method of claim 8, wherein the DCI format further comprises an indicator indicating whether the uplink grant is related to resource allocation for the first short TTI or the second short TTI.

10. The method of claim 9, wherein the indicator is a subframe offset identifying the first short TTI or the second short TTI.

11. The method of claim 8, wherein the DCI format further comprises a resource block assignment field including a resource indication value (RIV),
    wherein the RIV for the first short TTI is $RIV=N_{RB}^{DL}(L_{CRBs}-1)+RB_{start}$ when $(L_{CRBs}-1) \leq \lfloor N_{RB}^{UL}/2 \rfloor$ and $RIV=N_{RB}^{DL}(N_{RB}^{DL}-L_{CRBs}+1)+(N_{RB}^{DL}-1-RB_{start})$, otherwise while the RIV for the second short TTI is $$RIV = N_{RB}^{UL}\left(\left\lfloor \frac{N_{RB}^{UL}}{2} \right\rfloor + 1\right) + N_{RB}^{DL}(L_{CRBs}-1) + RB_{start}$$

when $(L_{CRBs}-1) \leq \lfloor N_{RB}^{UL}/2 \rfloor$ and $$RIV = N_{RB}^{UL}\left(\left\lfloor \frac{N_{RB}^{UL}}{2} \right\rfloor + 1\right) + N_{RB}^{DL}(N_{RB}^{DL}-L_{CRBs}+1) + (N_{RB}^{DL}-1-RB_{start}),$$

otherwise.

12. The method of claim 1, further comprising:
    determining in which way to transmit the data between a contention-based method and a scheduling-based method.

13. The method of claim 12, wherein the data is transmitted to the eNB through contention resources when the data is transmitted by the contention-based method.

14. The method of claim 13, wherein the contention resources is included in the second short TTI.

15. The method of claim 1, further comprising:
    receiving a response to the data transmission from the eNB through a physical hybrid automatic repeat request (HARQ) indicator channel (PHICH).

16. The method of claim 15, wherein the response is a response to at least one of the first short TTI and the second short TTI.

17. The method of claim 16, wherein a response to each of the first short TTI and the second short TTI is mapped to a resource of the PHICH in the form of an index pair of $(n_{PHICH}^{group}, n_{PHICH}^{seq})$.

18. The method of claim 17, wherein an $I_{PRB\_RA}$ value with respect to the first short TTI is equal to $I_{PRB\_RA}^{lowest\_index}$ or $I_{PRB\_RA}^{lowest\_index}+1$, and an $I_{PRB\_RA}$ value with respect to the second short TTI is equal to $I_{PRB\_RA}^{lowest\_index}+N_{RB}^{UL}$ or $I_{PRB\_RA}^{lowest\_index}+N_{RB}^{UL}+1$.

19. The method of claim 1, further comprising:
transmitting an urgent signal for requesting urgent resource allocation to the eNB;
receiving the requested urgent resource from the eNB through a physical hybrid automatic repeat request (HARQ) indicator channel (PHICH) channel; and
transmitting the data to the eNB using the urgent resource received through the PHICH.

20. A user equipment (UE) for transmitting and receiving data in a wireless communication system, the UE comprising:
a transceiver configured to transmit and receive a radio signal; and
a processor operably connected to the transceiver,
wherein the processor is configured to transmit and receive the data with an evolved Node B (eNB) through a radio frame,
wherein the radio frame includes a downlink (DL) radio frame and an uplink (UL) radio frame,
wherein the radio frame includes a legacy transmission time interval (TTI) and a short TTI,
wherein the legacy TTI includes two slots,
wherein each slot included in the legacy TTI includes a first short TTI and a second short TTI,
wherein the first short TTI and the second short TTI include a control region to which a control channel is allocated and a data region to which a data channel is allocated,
wherein downlink control information (DCI) related to uplink transmission of the first short TTI and the second short TTI is allocated to a control region of the first short TTI belonging to the downlink radio frame, and
wherein, when a highest physical resource block (PRB) index of the first short TTI is allocated as highest PRB index of a frequency band configured for the UE, a lowest PRB index of the second short TTI is allocated consecutively to the highest PRB index of the first short TTI.

* * * * *